(12) United States Patent
Dreiling et al.

(10) Patent No.: US 9,021,423 B2
(45) Date of Patent: *Apr. 28, 2015

(54) ENHANCED WIDGET COMPOSITION PLATFORM

(71) Applicants: Alexander Dreiling, Kelvin Grove (AU); Kathrin J. Hettel, Schwetzingen (DE); Fabian Eberhardt, Karlsruhe (DE); Philipp Heltewig, Paddington (AU); Daniel Ricketts, Toowong (AU)

(72) Inventors: Alexander Dreiling, Kelvin Grove (AU); Kathrin J. Hettel, Schwetzingen (DE); Fabian Eberhardt, Karlsruhe (DE); Philipp Heltewig, Paddington (AU); Daniel Ricketts, Toowong (AU)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,180

(22) Filed: Sep. 23, 2013

(65) Prior Publication Data

US 2014/0026095 A1    Jan. 23, 2014

Related U.S. Application Data

(63) Continuation of application No. 11/761,139, filed on Jun. 11, 2007, now Pat. No. 8,578,330.

(51) Int. Cl.
*G06F 9/44* (2006.01)
*G06F 3/0481* (2013.01)

(52) U.S. Cl.
CPC ............... *G06F 3/0481* (2013.01); *G06F 8/34* (2013.01); *G06F 8/38* (2013.01)

(58) Field of Classification Search
CPC ............ G06F 8/38; G06F 8/34; G06F 3/0481
See application file for complete search history.

(56) References Cited

U.S. PATENT DOCUMENTS

| | | | |
|---|---|---|---|
| 6,731,314 B1 * | 5/2004 | Cheng et al. ................. | 715/848 |
| 7,546,543 B2 * | 6/2009 | Louch et al. ................. | 715/762 |
| 7,561,681 B2 | 7/2009 | Booth et al. | |
| 7,873,422 B2 | 1/2011 | Dumas et al. | |
| 7,984,420 B2 | 7/2011 | Eldridge et al. | |
| 8,001,519 B2 | 8/2011 | Conallen et al. | |
| 8,127,237 B2 * | 2/2012 | Beringer ....................... | 715/762 |
| 8,171,451 B2 | 5/2012 | Boland et al. | |
| 8,234,622 B2 | 7/2012 | Meijer et al. | |
| 8,291,408 B1 * | 10/2012 | Czymontek .................. | 717/178 |
| 8,713,520 B2 * | 4/2014 | Bank et al. ................... | 717/111 |
| 2002/0152244 A1 * | 10/2002 | Dean et al. ................... | 707/530 |
| 2003/0004746 A1 * | 1/2003 | Kheirolomoom et al. ..... | 705/1 |

(Continued)

FOREIGN PATENT DOCUMENTS

CA       2550832 A1     3/2007

OTHER PUBLICATIONS

Daniel Salber et al., "The Context Toolkit: Aiding the Development of Context-Enabled Applications", [Online], May 1999, pp. 436-441, [Retrieved from Internet on Sep. 23, 2014] <http://delivery.acm.org/10.1145/310000/303126/p434-salber.pdf>.*

(Continued)

*Primary Examiner* — Thuy Dao
*Assistant Examiner* — Ziaul A Chowdhury
(74) *Attorney, Agent, or Firm* — Fish & Richardson P.C.

(57) ABSTRACT

An enhanced widget composition platform, in which code is automatically generated based on receiving a selection of at least a first service and a widget engine via the web-based widget composition platform, the code, when invoked by the selected widget engine, implementing a widget that is operable to communicate with the first service.

18 Claims, 15 Drawing Sheets

(56) References Cited

U.S. PATENT DOCUMENTS

| | | |
|---|---|---|
| 2003/0206195 A1 | 11/2003 | Matsa et al. |
| 2003/0222912 A1 | 12/2003 | Fairweather |
| 2004/0133445 A1 | 7/2004 | Rajan et al. |
| 2004/0215740 A1 | 10/2004 | Frank et al. |
| 2005/0125416 A1 | 6/2005 | Kirsch et al. |
| 2005/0273499 A1 | 12/2005 | Goodman et al. |
| 2006/0036679 A1* | 2/2006 | Goodman et al. ............ 709/203 |
| 2006/0074704 A1 | 4/2006 | Shukla et al. |
| 2006/0101393 A1* | 5/2006 | Gerken et al. ................ 717/109 |
| 2006/0129917 A1 | 6/2006 | Volk et al. |
| 2006/0173669 A1 | 8/2006 | Dreiling et al. |
| 2006/0212836 A1* | 9/2006 | Khushraj et al. ............. 715/866 |
| 2006/0248506 A1* | 11/2006 | Luo et al. ...................... 717/104 |
| 2006/0264204 A1 | 11/2006 | Livingood |
| 2006/0277484 A1 | 12/2006 | Brockway |
| 2007/0011620 A1* | 1/2007 | Mendel et al. ................ 715/762 |
| 2007/0038934 A1 | 2/2007 | Fellman |
| 2007/0050710 A1* | 3/2007 | Redekop ....................... 715/523 |
| 2007/0101291 A1 | 5/2007 | Forstall et al. |
| 2007/0220035 A1* | 9/2007 | Misovski ...................... 707/102 |
| 2007/0288858 A1* | 12/2007 | Pereira et al. ................ 715/764 |
| 2008/0091777 A1 | 4/2008 | Carlos |
| 2008/0148283 A1* | 6/2008 | Allen et al. ................... 719/316 |
| 2008/0189679 A1 | 8/2008 | Rodriguez et al. |
| 2008/0300980 A1 | 12/2008 | Benjamin et al. |
| 2009/0282385 A1 | 11/2009 | Boland et al. |
| 2012/0311532 A1 | 12/2012 | Foti |

OTHER PUBLICATIONS

Michael Spahn et al. "End-User Development of Enterprise Widgets", [Online], 2009, pp. 1-20, [Retrieved from Internet on Mar. 1, 2015], <http://www.wiwi.uni-siegen.de/wirtschaftsinformatik/paper/2009/spahn_wulf_eud_of_enterprise_widgets_2009.pdf>.*

Stefan Pietschmann et al., "A Thin-Server Runtime Platform for CompositeWeb Applications", [Online], pp. 390-395, [Retrieved from Internet on Mar. 2, 2015], <http://ieeexplore.ieee.org/stamp/stamp.jsp?tp=&arnumber=5476511>.*

Nassim Laga et al., "Widgets and Composition Mechanism for Service Creation by Ordinary Users", [Online], 2012, pp. 52-60, [Retrieved from Internet on Mar. 2, 2015], <http://servicearchitecture.wp.tem-tsp.eu/files/2012/09/06163582.pdf>.*

Santiago Meliá et al., "A Model-Driven Development for GWT-Based Rich Internet Applications with OOH4RIA", [Online], 2008, pp. 13-23, [Retrieved from Internet on Mar. 2, 2015], <http://citeseerx.ist.psu.edu/viewdoc/download?doi=10.1.1.466.9199&rep=rep1&type=pdf>.*

'Pipes' [online].Yahoo, 2007, [retrieved on Dec. 17, 2008]. Retrieved from the Internet: <URL: http://web.archive.org/web/20070608021843/pipes.yahoo.com/pipes/docs?doc=overview>, 1 page.

'Google Desktop SDK: Gadget Designer' [online]. Google Desktop, 2007, [retrieved on Dec. 17, 2008]. Retrieved from the Internet: <URL: http://web.archive.org/web/20070609052214/desktop.google.com /dev/designer.html>, 4 pages.

'Windows Live Gadget Developer's Guide' [online]. Microsoft, 2007, [retrieved on Dec. 17, 2008]. Retrieved from the Internet: <URL: http://web.archive.org/web/20070203052820/microsoftgadgets.com/livesdk/docs/default.htm>, 13 pages.

Baresi, et al., "Extending UML for modeling Web Application," [Online], Proceedings if the 34th Hawaii International Conference on System Sciences—2001, 10 pages, [Retrieved on Nov. 17, 2011], [Retrieved from Internet], <http://3551492760830451128-a-1802744773732722657-ssites.googlegroups.com/site/jegiraldp/extendingUML.pdf>.

Foster, et al., "Model-based Verification of Web Service Compositions," IEEE-2003, [Online], [Retrieved online on Nov. 17, 2011], [Retrieved from Internet], <http://ieeexplore.ieee.org/stamp/stamp.jsp?tp=&arnumber=1240303>, 10 pages.

Salber, et al., "Aiding the Development of Context Enabled Applications", May 1999, [Online], [Retrived Online on Nov. 17, 2011], [Retrieved from Internet], <http://delivery.acm.org/1 0.1145/31 0000/303126/p434-salber.pdf>, pp. 434-441.

Hua Xiao et al Automatic Approach for Ontology-Driven Service Composition, [Online], IEEE 2009, [Retrieved from Internet on Aug. 1, 2013], <http://ieeexplore.ieee.org/stamp/stamp.jsp?tp=&arnumber=5410470>, pp. 1-8.

Hossein Pourreza et al., "On the Fly Service Composition for Local Interaction Environments", [Online], IEEE 2006, [Retrieved from Internet on Aug. 1, 2013], <http://ieeexplore.ieee.org/stamp/stamp.jsp?tp=&arnumber=1599012>, pp. 1-6.

Vid Podpecan et al., "Orange4WS Environment for Service-Oriented Data Mining", [Online],2012, [Retrieved from Internet on Aug. 1, 2013], <http://kt.ijs.si/NadaLavrac/Publications/COMJLN-2012-Orange4WS.pdf>, pp. 82-98.

Salber, et al., "The Context Toolkit: Aiding the Development of Context-Enabled Applications",[Online], May 1999, [Retrieved from Internet on Aug. 1, 2013], <https://smartech.gatech.eduispui/bitstream/1853/3481/1/98-33.pdf>, pp. 434-441.

Summons to Attend Oral Proceedings Pursuant to Rule 115(1) EPC for Application No. 08009960.9, mailed May 13, 2011, 5 pages.

European Search Report for European Patent Application No. EP08009960, dated Sep. 17, 2008, 6 pages.

Armstrong, "Modeling Web Services with UML," OMG Web Services Workshop 2002, [Retrieved online: <http://www.omg.org/news/meetings/workshops/presentations/WebServices_2002/03-2_ArmstrongModelingWebServices_with_UML.pdf>], 58 pages.

Stal, "Web Services Beyond Component-Based Computing," Communications of the ACM, vol. 45, No. 10, Oct. 2002, [Retrieved online: <http://delivery.acm.org/1 0.1145/580000/570934/p71-stal.pdf?key1=570934&key2=8837064031 &coll=DL&dl=ACM &ip=151 .207.242.4&CFI D= 19424283 &CFTOKEN=53806079>], pp. 71-76.

* cited by examiner

FIG. 11

ENHANCED WIDGET COMPOSITION PLATFORM

CROSS-REFERENCE TO RELATED APPLICATIONS

This application is a continuation application of and claims priority to U.S. application Ser. No. 11/761,139 filed on Jun. 11, 2007, the disclosure of which is expressly incorporated herein by reference in its entirety.

BACKGROUND

1. Field

The present disclosure generally relates to widgets (or gadgets), and at least one particular implementation relates to an enhanced widget composition platform.

2. Description of the Related Art

In order to be able to make good decisions, it is important to have access to timely, accurate and relevant information. By combining various pieces of information in useful ways, contexts may be formed that have a value greater than the combined values of each separate piece of information.

In one simple example, three separate log entries may reflect a supplier bank account number change and roll-back to the original account number, an employee bank account number equal to the changed supplier bank account number, and an invoice payment to the changed supplied bank account number. Individually, these log entries may appear absolutely normal. Combined, however, these separate entries provide a context of fraud, since the invoice has been paid between the point in time the supplier bank account number was changed and the change was rolled back, and the changed supplier bank account number is the same as the employee bank account number. The combination of information from different sources may thus provide the necessary synergy to form useful contexts.

SUMMARY

According to one general implementation, code is automatically generated based on receiving a selection of at least a first service and a widget engine via a web-based widget composition platform. When invoked by the selected widget engine, the code implements a widget that is operable to communicate with the first service.

Implementations may include one or more of the following features. For example, the selection of the first service and the widget engine may be a user selection or an automatic selection. The web-based widget composition platform may further include a design mode and a preview mode, where the first service is selected via the web-based widget composition platform (in a design mode), and where the widget is simulated via the web-based widget composition platform (in a preview mode). The code may be invoked in a browser environment using a compatibility layer that emulates the widget engine, thereby simulating the widget in the widget composition platform.

In further examples, a service mediator instance may be created based on receiving the selection, the service mediator instance including a service requestor component, an interpreter component, and a renderer component. The service requestor component is operable to gather input parameters, transmit a service call to the first service based on the input parameters, and transmit raw data results of the service call to the service mediator instance. The interpreter component is operable to process the raw data results into an interpreted SERVICEDataMODEL object, and transmit the SERVICEDataMODEL object to the service mediator instance. The renderer component is operable to render a visual representation of data in the SERVICEDataMODEL object.

Additionally, the code may further be automatically generated based on receiving a selection of a design element defining an appearance of the widget or for performing a non-service-related function, based on receiving a selection of a second service via the web-based widget composition platform, or based on receiving a selection connecting an output of the first service with an input of the second service via a WIDGETOBJECTMANAGER module. A CONNECTOR object for an event may be generated, the CONNECTOR object adding the input of the second service as a listener and adding the output of the first service as a caller. An ENVELOPE object may be sent from the caller to the listener based on upon detecting the event, the ENVELOPE object encapsulating output values from the caller.

Moreover, the selection connecting the output of the first service with the input of the second service is valid may be verified via a LINEMANAGER module, and a representation of the selection connecting the output of the first service with the input of the second service may be output, via the LINEMANAGER module, if the selection connecting the output module of the first service with the input of the second service is verified to be valid. The widget may be operable to communicate with the first service via a Service Oriented Architecture Protocol (SOAP) call or other HyperText Transfer Protocol (HTTP) call. Data may be received from the first service, and the data may be displayed via the widget.

Also, the widget composition platform may be a What-You-See-Is-What-You-Get (WYSIWYG) Integrated Development Environment (IDE). The widget may be output, such as by uploading the widget to a user device. The first service may be a web service, a Really Simple Syndication (RSS) service, a Multidimensional eXpressions (MDX) service, or any data source (such as a website) reachable via a network. The at least the first service may be added to a global widget model using a WINDOWOBSERVER module based on receiving the selection of the at least the first service. A state change of the widget composition platform may be tracked, via the WINDOWOBSERVER module. An array including the at least the first service, a position and a size of each of the at least the first service, and connections between the at least the first service may be transmitted via the WINDOWOBSERVER module.

According to another general implementation, a computer program product is tangibly embodied in a machine-readable medium. The computer program product includes instructions that, when read by a machine, operate to cause a data processing apparatus to generate code based on receiving a selection of at least a first service and a widget engine via a web-based widget composition platform, the code, when invoked by the selected widget engine, implementing a widget that is operable to communicate with the first service.

According to another general implementation, a device includes a processor configured to generate code based on receiving a selection of at least a first service and a widget engine via a web-based widget composition platform, the code, when invoked by the selected widget engine, implementing a widget that is operable to communicate with the first service.

According to another general implementation, a device includes means for generating code based on receiving a selection of at least a first service and a widget engine via a web-based widget composition platform, the code, when invoked by the selected widget engine, implementing a widget that is operable to communicate with the first service.

According to another general implementation, a user selection of a first service is received via a web-based, WYSIWYG widget composition platform, a user selection of a second service is received via the widget composition platform, and a user selection connecting an output of the first service with an input of the second service is received via the widget composition platform. It is verified whether the user selection connecting the output of the first service with the input of the second service is valid, a user selection of a widget engine is received via the widget composition platform, and code is automatically generated based on receiving the selections of the first service, the second service, and the widget engine, the code, when invoked by the selected widget engine, implementing a widget that is operable to communicate with the first and second services. The code is invoked in a browser environment using a compatibility layer that emulates the widget engine, thereby simulating the widget in the widget composition platform, first data from the first service is received, and an ENVELOPE object is sent from the output of the first service to the input of the second service based on upon detecting an event, the ENVELOPE object encapsulating output values from the first service. Second data is received from the second service based on receiving the ENVELOPE object at the input of the second service, the second data is output, and the code is uploaded to a user.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 11 depicts an exemplary widget.

Like reference numbers represent corresponding parts throughout.

DETAILED DESCRIPTION

At its most basic, the enhanced widget composition platform is a web-based, WYSIWYG IDE that allows users to easily create widgets using an intuitive desktop-style development environment. By using Web 2.0 technologies to provide the IDE via a web browser, the enhanced widget composition platform may be invoked without installing additional application software on a local computer. In doing so, even users without specialized programming skills can visually create widgets, and output (or 'deploy') these widgets for use with in conjunction with various widget engines, such as the YAHOO!® widget engine or the MICROSOFT VISTA® gadget engine, amongst others. An IDE generally refers to a computer application that assists novice or experienced software developers to develop software.

Figure 1:
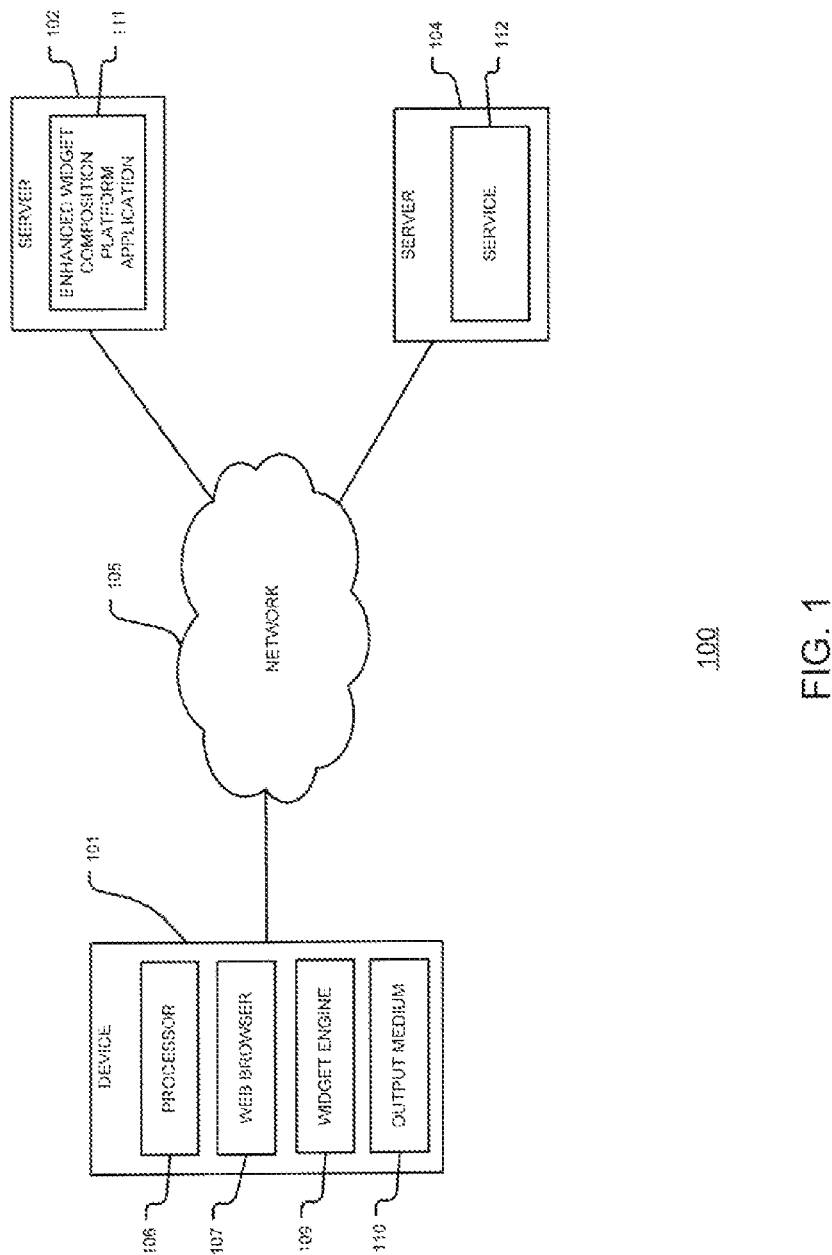
FIG. 1 is a block diagram of an exemplary system, according to one general implementation.

FIG. 1 is a block diagram of an exemplary system 100, according to one general client-server implementation. Briefly, the system 100 includes a device 101, and servers 102 and 104, connected via a network 105

The device 101 includes (amongst other components) a processor 106, a web browser 107, a widget engine 109, and an output medium 110. The processor 106 is configured to generate code based on receiving a selection of at least a first service and a widget engine via a web-based widget composition platform. When invoked by the selected widget engine, the code implements (i.e. causes, effectuates, provides for, outputs and/or realizes) a widget that is operable to communicate with the first service. The web browser 107 represents the front-end of the enhanced widget composition platform, and displays the user interface of the enhanced widget composition platform. The web browser 107 may be any web browser, such as a MICROSOFT® INTERNET EXPLORER® web browser, the APPLE® SAFARI® web browser, or others.

A widget (or "gadget") may be a client-side, self-contained web-application that displays and updates local and remote data, or an application that runs in the browser environment with the aid of another application or engine. Widgets may be executed using an application engine (or "widget engine"), such as the YAHOO!® widget engine or the WINDOWS VISTA® SIDEBAR® widget engine. A widget can communicate with services on the Internet using SOAP calls or other HTTP calls, to retrieve and update data. This data is then displayed in an efficient manner by the widget. SOAP refers to a protocol for exchanging XML-based messages over computer networks, often using HTTP.

Amongst other components, the server 102 includes an enhanced widget composition platform application 111, and the server 104 includes a service 112. The server 102 may be implemented as an APACHE™ TOMCAT™ server that uses a WICKET™ or other framework that is capable of handling Asynchronous JavaScript and XML (AJAX) operations. The server 102 may be used for data storage and to manage the widget deployment (or 'outputting') process.

The service may be a web service, an RSS service, an MDX service, or another service. Generally, a service includes software designed to support interoperable, machine-to-machine interaction over a network. Furthermore, the service may be any data source (such as a website) reachable via a network, where data is retrieved from the data source and parsed. For example, a service may refer to a client or server that communicates using eXtensible Markup Language (XML) messages that follow the SOAP standard. In another implementation, the functions or structures of the server 102 and the server 104 are combined into a single server, or are partially or wholly omitted.

Much of the business logic of the enhanced widget composition platform application 111 is actually invoked on the device 101, using JavaScript. In this regard, many associated processes are implemented on the client side, via the JavaScript files. With this distribution of resources, the logic is available on the client device when designing the widget using the enhanced widget composition platform, and is also available in the widget itself that is output on the client device.

Figure 2:
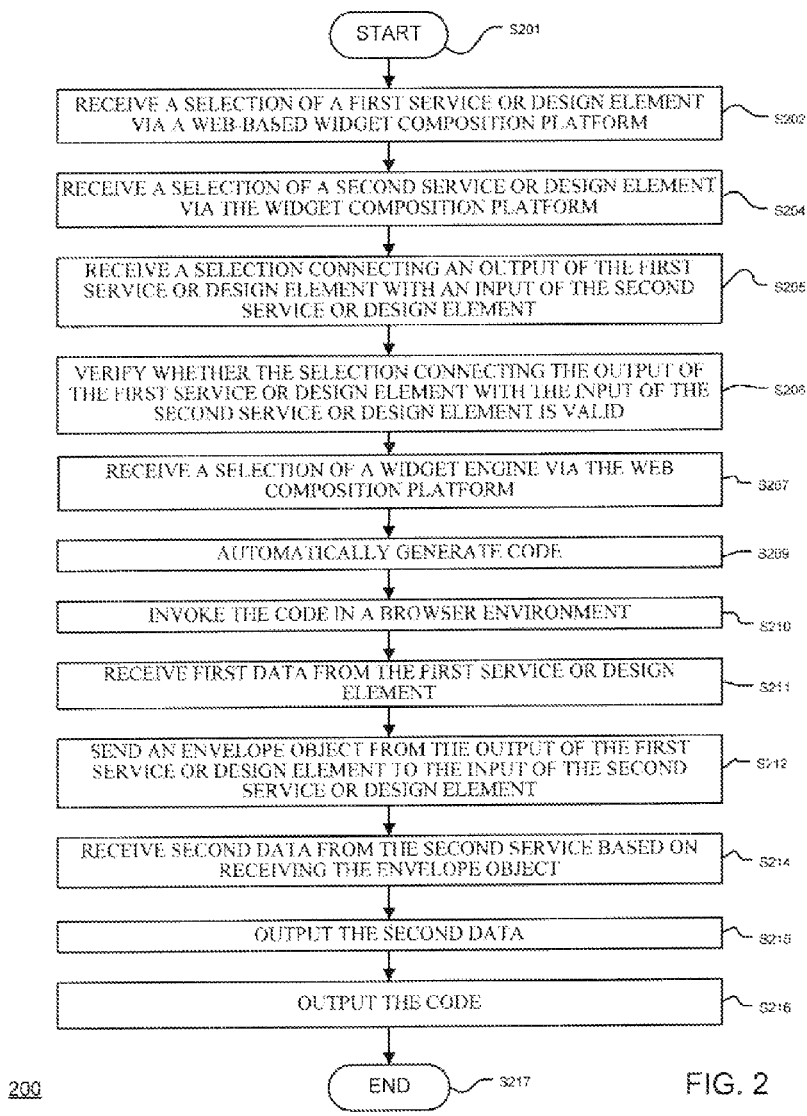
FIG. 2 is a flowchart illustrating an exemplary process, according to another general implementation.

FIG. 2 is a flowchart illustrating an exemplary process 200, according to another general implementation. Briefly, code is automatically generated based on receiving a selection of at least a first service and a widget engine via a web-based widget composition platform. The code, when invoked by the selected widget engine, implements a widget that is operable to communicate with the first service.

In more detail, the process 200 begins when a user interface of a web-based, enhanced widget composition platform is output via a web browser on a client device (S201). The user interface may be generated by a back-end server, such as the server 102, and transferred via a network to a web browser of a client device, such as the web browser 107 of the device 101. In this regard, the enhanced widget composition platform itself is initialized by loading JavaScript libraries, and positioning user interface elements within the web browser environment.

Figure 3:
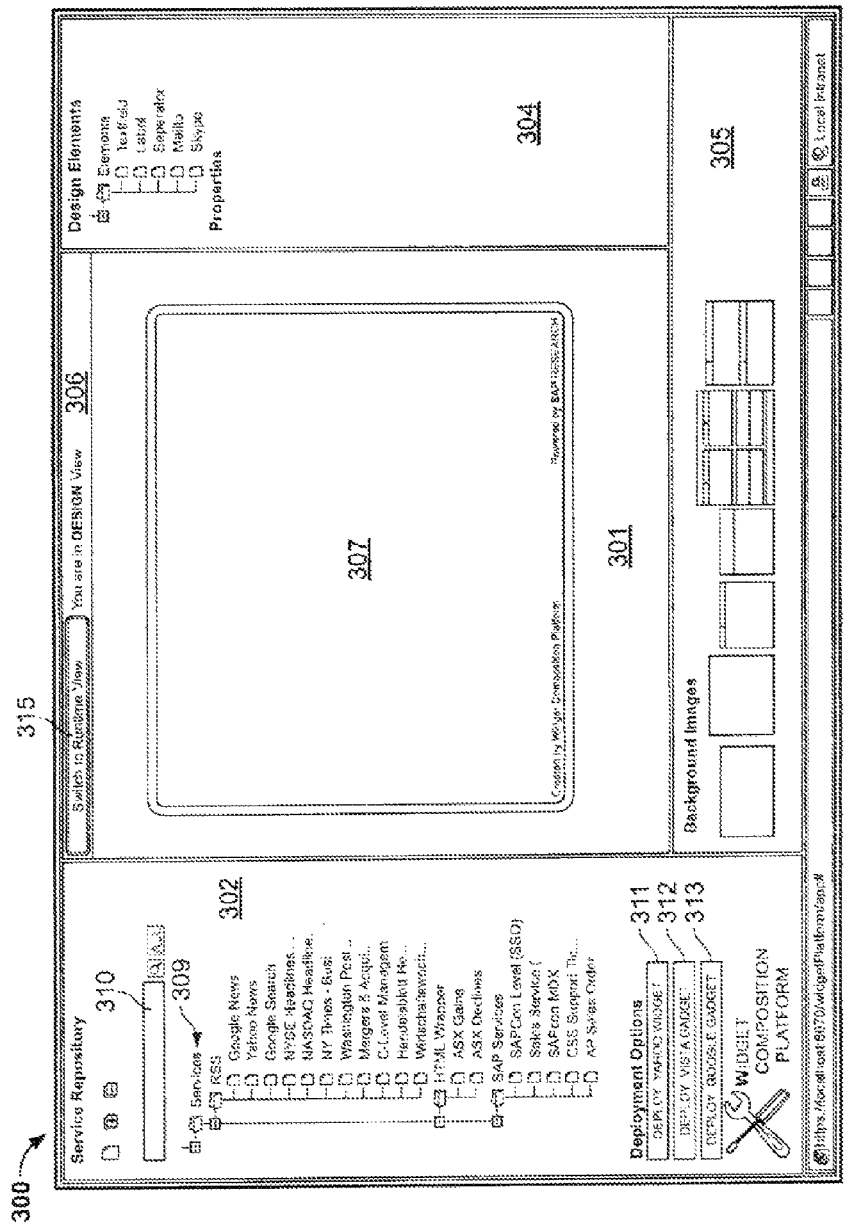
FIGS. 3, 4, 6, 9, 10, 12 and 13 depict an exemplary widget composition platform according to another general implementation, in various states.

Referring ahead briefly, FIG. 3 illustrates one such exemplary widget composition platform 300, that includes a widget output region 301, service repository region 302, a design element repository region 304, a background image repository region 305, and a mode selector region 306. The widget output region 301 is the portion of the widget composition platform 300 where widget components are assembled, arranged and re-arranged, and connected, and where the assembled widget objects simulate or preview a complete widget.

FIG. 3 shows a widget object 307 being designed in widget composition platform 300. Although the widget object 307 has the appearance of a widget, it is actually a visualization of how a widget (specifically, the widget-under-design) will appear when deployed. As described in more detail below, although the widget object 307 may use widget engine-specific code to communicate with services, the functionality of the widget object 307 is provided through the use of a compatibility layer that emulates one ore more widget engines within a browser environment, thus differentiating the widget object 307 from an actual widget.

When a service is added to the platform's working space, a service mediator instance manager module generates a generic syntax to mediate between components of a service mediator instance associated with the added service. This generic syntax is used to dynamically include the service mediator instance into the working area, and handles the invocation of the service. As described in more detail below, the service mediator instance manager module may be used, for example, to connect a service requestor component to an interpreter component, and the interpreter component to a renderer component.

The service mediator instance manager module may also be used to handle events or data received from other service mediator instances and design element instances. An 'event' generally refers to a user action, such as a mouse click or key depression, or the reception of a message from another application.

The service repository region 302 displays, and allows for the selection of, services. In the FIG. 3 example, services may be selected by visually filtering a list of available services using an expandable tree control 309, or by searching for the service by entering text strings into text field 310. Other controls, techniques, or approaches may also be used to locate searches. Example services may include RSS services, such as GOOGLE® News, YAHOO!® News, GOOGLE® Search, New York Stock Exchange Headlines, NASDAQ Headlines, New York Times Headlines, Washington Post Headlines, or other internal or external services.

The service repository region 302 also includes at least one control, such as the controls 311 to 313, that enables the selection of a widget engine. This selection is used to determine or specify the format or language of the widget code output by the enhanced widget composition platform. For example, a user that wants to generate (or 'output') a YAHOO! widget would simply select 'Deploy Yahoo Widget' control 311, while a user that wants to generate a MICROSOFT WINDOWS VISTA gadget or a GOOGLE gadget would select 'Deploy Vista Gadget' control 312 or 'Deploy Google Gadget' control 313, respectively. Such a selection of various widget types could also be made consecutively or in parallel, or using a different type of control. Furthermore, other widget types could be mapped to controls 311 to 313, or further controls could be added.

Although the service repository region 302 may include several predefined services, these services may be deleted or rearranged, or the service repository region 302 may be extended by creating new services using a service definition window. A service definition window may be used to add a new services by receiving a type of service, a location of the new service, configuration preferences, or other data, from a user. Following this configuration process, a new service mediator instance may be associated with a new service that is added to the service repository region 302, for example by adding the new service to the expandable tree control 309 or other control. In this manner, new services may be added, and existing services may be adapted.

Within the enhanced widget composition platform 300, data received from services is displayed in service windows. Using formatted data from a renderer component of a service mediator instance, these service windows display the received data in a manner specified by predefined or user-adjustable parameters. For instance, the user may assign an interpreter component and a renderer component that output data received from a service in a text field, a table, or a chart. Accordingly, each service is stored in association with its the adjunct interpreter component and renderer component, in the service repository region 302.

Similarly, the design element repository region 304 displays, and allows for the selection of, design elements. A design element (DE) is similar to a service, although does not necessarily include a service requestor component, an interpreter component or a renderer component like a service, since design elements do not place service calls or process incoming data. In various implementations, a design element may be a non-functional graphical element used for layout purposes, or the design element may include advanced functionality, such as the ability to send data via communication links upon the selection of an icon, or accept or output text strings. Sample design elements include, for example, non-functional design elements such as non-changeable text fields, labels, shapes, or separators, or functional design element such as mailto:, SKYPE® or telephone links, or text fields that display output text strings or graphics, or receive input text strings.

The background image repository region 305 displays, and allows for the selection of, predefined background templates. By providing commonly-used background templates in an easy-to-access portion of the enhanced widget composition platform 300, novice users may create visually-stunning widgets that have a custom-created look and feel, without requiring or using advanced programming skills.

The mode selector region 306 displays the current mode, and allows for the selection of a different mode, such as by using a mode selector control 315. For example, the enhanced widget composition platform 300 may include a design mode and a preview mode. Services are selected via the web-based widget composition platform 300 in a design mode, and the widget is simulated via the enhanced widget composition platform 300 in a preview mode.

Intuitively, the widget may be designed in design mode. In this mode, the enhanced widget composition platform 300 behaves similarly to desktop-based IDEs such as the MICROSOFT® VISUAL STUDIO® software development environment. Like desktop-based IDEs, the enhanced widget composition platform 300 allows users to drag and drop components, such as from the service repository region 302 or the design element repository region 304, to connect components for contextualization purposes, and to assign or define visual characteristics of the components, such as color or size. Even in design mode, however, the enhanced widget composition platform 300 communicates with services, outputs live data where and when appropriate, and exchanges data between components.

Contextualization generally refers to the process of accessing data from a first data source based on the results of a previous data access from a second data source, and may result in the retrieval of data which is more relevant than would turn up from two separate, or disconnected data accesses. Contextualized data, therefore, refers to the output or result of a second data access, where an input term or parameter of the second data access defined by a previously-occurring first data access.

In a simple example, a first access of a relatively static sales database might return a list of customers who have made a purchase in the last month. A second access of a relatively static address database might result in a list of customers who have made a purchase in the last month who live in a certain city. If a salesman is planning on visiting this city, this list of customers who live in that city who have made a purchase in the last month would be far more valuable than a list of customers who live in that city and a separate list of customers who have made a purchase in the last month. Having obtained this list of customers who live in the city who have made a purchase in the last month from two separate sources, that list is deemed to be contextualized data.

In a more complex example, a first access of a relatively dynamic news database might result in a list of companies whose profits have increased, and a second access of a contact database might result in a contact information for human resources personnel who work at these companies. If an employment agency is seeking leads to companies that may be growing and may need to hire personnel, this filtered contact information would perhaps be valuable. Since this filtered contact information was retrieved from different data sources, it is also deemed to be contextualized data. In a similar vein, a contextualization event is any action or occurrence that causes data to be passed from an output of one data source (or service) to an input of another data source (or service).

The widget is simulated in a runtime mode (or preview mode). In this mode, the widget objects are previewed to show the user how the widget will look upon deployment. Based on this simulation, a user may switch back to design mode and redesign elements, or choose to output the widget. It is not necessary to switch to runtime mode to view the contextualization or exchange of data between components, since the enhanced widget composition platform communicates with services in the design mode as well.

Returning to FIG. 2, a selection of a first service or design element is received via the web-based, enhanced widget composition platform (S202). The selection of the first service may be an automatic selection, or the selection may be a manual user selection. A user selection occurs, for example, when a user selects a service in the service repository region 302 or a design element in the design element repository region 304 using a mouse or other pointing device.

Figure 4:
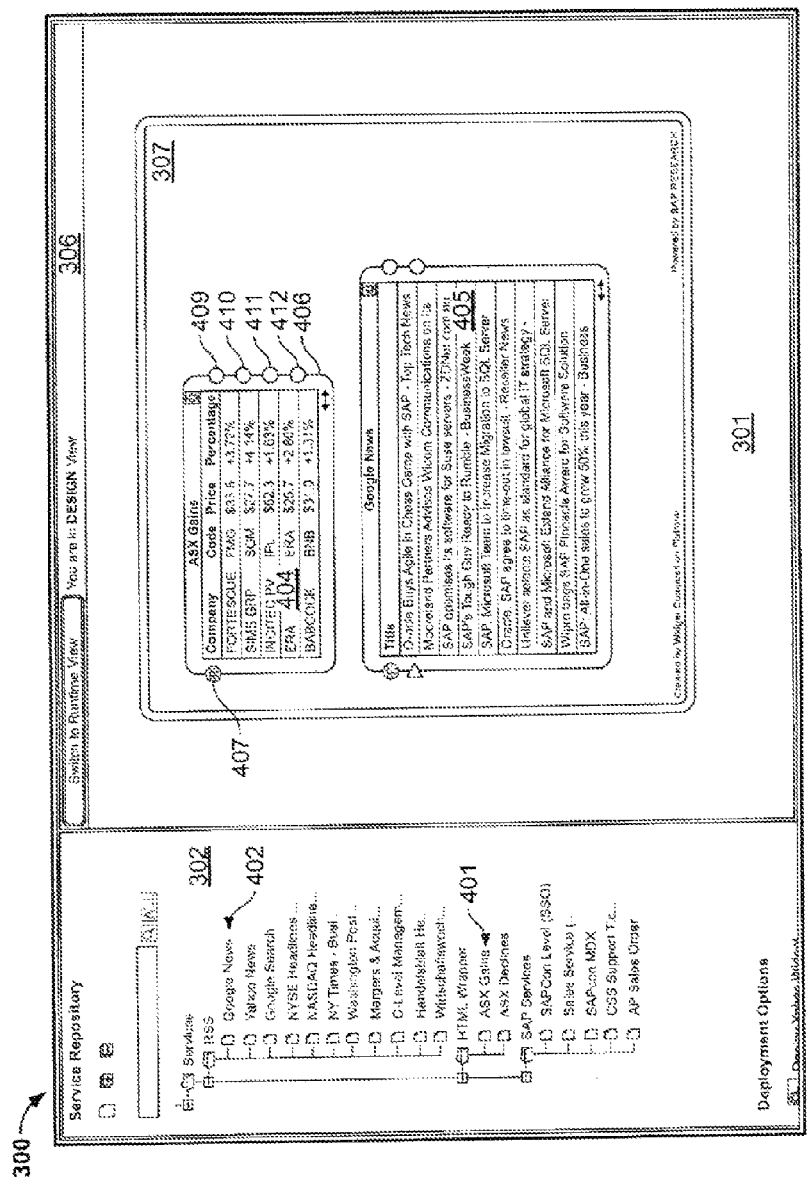

FIG. 4 depicts the exemplary widget composition platform 300, in a state where services 401 and 402 have been selected. A first service 401 represents an Australian Stock eXchange (ASX) Gains service, and a second service 402 represents the GOOGLE® News service. A user may select either of these services by selecting the services in the service repository region 302 using a mouse, and dragging the services to the widget output region 301. Alternatively, the services may be selected through a combination of keystrokes, by using a touch-screen drag-and-drop or selecting operation, through voice commands, or by any other input technique.

Once dragged in to the widget output region 301, the service windows 404 and 405 (representing the first and second services 401 and 402, respectively) appear, outputting data received from the associated services in a tabular or other predefined or user-selectable format. For instance, the service window 404 displays the top five gainers at a particular time from the ASX Gains service 401 in four columns, including a company name, a stock ticker code, a price, and a gain percentage. The service window 405 displays top news from the GOOGLE® News service 402. Notably, in the state illustrated in FIG. 4, the information displayed in each service window not necessarily related or contextualized.

Each service window includes various components. For example, the service window 404 includes a frame 406 defining a user-adjustable boundary of the service window 404, at least one input control (or "input"), such as an input 407, and at least one output control (or "output"), such as the outputs 409 to 412. Since calls to services may include input parameters, the input control is used to receive the output of other services or design elements, thereby shaping or otherwise defining the input or query parameters used by that service. Similarly, the output control is used to output data from a service or design element to another component.

Generally, each input control is a visualization of an associated input parameter (or 'port') of the service. For instance a fictional news service may base a data retrieval off of keyword, start date, and end date input parameters or ports. A service window for this fictional news service would have up to three input controls, one for each port. Keyword data (associated with the first port) could be dynamically or statically specified using a text-box design element, by connecting an output of the text-box design element to the input control associated with the keyword port.

Alternatively, keyword data could be dynamically specified by connecting the input control associated with the keyword port to an output of another service window, where output of the other service window is expected to output keywords. In a further example, if the other service window has the potential to output multiple keywords, events (such as mouse events), may be assigned to the other service window, such that a specific keyword is output from the other service window based upon the occurrence of the event.

A single service may output several data items. For example, the service window 404 outputs company data, ticker symbol data, price data, and percentage data for each of five different companies. Thus, different output controls may be assigned to different discrete data items. In the FIG. 4 example, the output control 409 is associated with company data, the output control 410 is associated with ticker symbol data, the output control 411 is associated with price data, and the output control 412 is associated with percentage data. Alternatively, output controls 409 to 412 could be associated with the first through fourth rows of data displayed on the service window 404.

In this regard, data output via the output control 404 may be defined by the an associated data region or type in combination with a user interaction event. For instance, if output control 409 is associated with a company name, the company name data output via the output control 409 may change depending upon a mouse event occurring on or over a company name. As will be described in further detail below, these input and output controls are useful for contextualizing data. If a user connects an output associated with one service window to an input of a second service window via a user interface, the data presented on the second service window can be dynamically updated and contextualized based upon the user selecting or interacting with data in the service window.

While the service window 404 is shown in FIG. 4 as including several elements, components or controls, in a runtime mode many of these elements may be omitted or made transparent. As an example, the frame element 406, which is useful in a design mode to establish the bounds of the service window 404, could be removed in a preview mode to reduce visual clutter and to accentuate the importance of, or visually filter, the output data.

Figure 5:
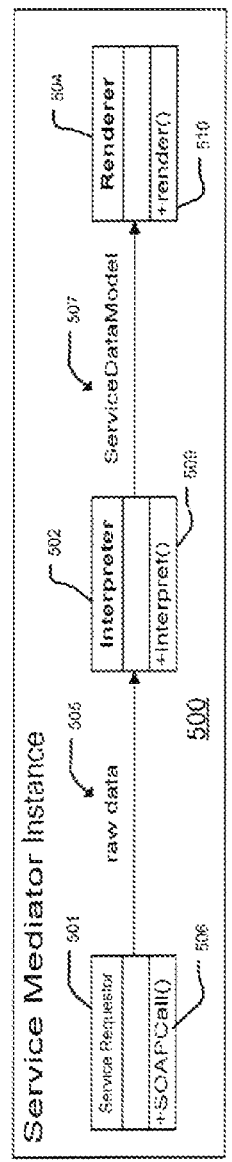
FIG. 5 is a block diagram illustrating an exemplary service mediator instance.

FIG. 5 is a block diagram illustrating an exemplary service mediator instance 500. The service mediator instance is created based on receiving a selection of a service via the widget composition platform. If a service is selected, the enhanced widget composition platform 300 creates a new service mediator instance 500 associated with the selected service, as well as a new service window (or 'visual container') that displays the rendered output of the selected service. The service mediator instance 500 includes at least a service requestor component 501, an interpreter component 502, and a renderer component 504.

The service requestor component 501 is operable to gather input parameters, transmit a service call (e.g. a service call generated by +SOAPCALL( ), INVOKE( ) or another function or concept of the service requestor component 501) to the first service based on the input parameters, and transmit raw data results 505 of a service call to the service mediator instance 500.

In one implementation, the service requestor component 501 is embedded in a security framework that takes care of federated authentication functionality, allowing the widget to communicate with multiple services without individually or repeatedly authenticating with each service. In the web browser environment, the use of federated authentication (or 'single-sign-on' authentication) may be supported by default, via client certificate authentication. Outside of the browser environment where the widget may operate, however, additional components may be included to allow the various service requestor components to support federated authentication.

The interpreter component 502 is operable to process the raw data results 505 from the service requestor component 501 into an interpreted SERVICEDataMODEL object 507, and to transmit the SERVICEDataMODEL object 507 to the service mediator instance 500. The interpretation of the raw data results 505 into a SERVICEDataMODEL object 507 may occur using +INTERPRET( ) 509 or another aspect of the interpreter component 502 to parse XML or HTML code.

After the processing the raw data results 505 into a usable form, the SERVICEDataMODEL object 507 is populated with interpreted data, and transmitted to the service mediator instance 500. The interpreter component 502 may be closely related to the type of service from which data is received, since it acts as an interface for retrieving and providing a meaningful interpretation of raw data. For instance, a service which retrieves XML for Analysis (XMLA) data may use an XMLA interpreter.

The renderer component 504 is operable to output a visual representation of data from the SERVICEDataMODEL object 507. Since the structure of the SERVICEDataMODEL object 507 is standardized, any renderer component 504 may be used to output this object. The renderer component 504 includes properties that can be customized to vary a visualization, such as color properties, chart types or properties, column or row formatting properties, font properties, or others. Using the SERVICEDataMODEL object 507, the renderer component 504 receives specifically-formatted, meaningful data from the interpreter component 509. A table renderer, for example, may receive interpreted table data in an array of cells.

Based on the renderer type, the renderer component 504 uses the +RENDER( ) function 510 to output a visual representation of the processed data, at a particular position on the widget object, and with specified dimensions. The position and dimensions of the processed data may be defined by the service window used by the renderer component 504 to output the processed data. A renderer component 504 also stores components that trigger contextualization events based on interactions between the user and the service windows rendered by the renderer component 504. For example, the renderer component 504 may store a component that triggers an action based on a ONMOUSEOVER event occurring at an associated service window.

After a service or design element has been dragged-and-dropped onto the widget output region 301, the service or design element is added to a global widget model, via a WINDOWOBSERVER module, which keeps track of all the services and design elements added to the widget output region 301. The data stored by the WINDOWOBSERVER module is gathered during the design process, or when deployment or output of the widget is requested. The WINDOWOBSERVER module then delivers the array describing position, size or other characteristics of the service window or design element window in the widget output region 301.

The array data is saved and used to reinitialize the services and design elements in the appropriate positions on the output widget. The WINDOWOBSERVER module also keeps track of connections between services and design elements, and delivers these connections for re-initialization purposes after deployment or output. Generally, the WINDOWOBSERVER module tracks each state change of the designed widget on the user interface, allowing the enhanced widget composition platform 300 to accurately output a widget according to the user's intended design.

When a service window or design element window is removed from the widget output region 301, the WINDOWOBSERVER module removes the service from the global widget model, prior to deployment. Upon receiving a selection to output the widget, the WINDOWOBSERVER module iterates through the service windows and design element windows in the widget output region 301, and retrieves the position and dimension data. The WINDOWOBSERVER module further iterates through the various connections between services and design elements, and adds the connection information to the global widget model. Moreover, the WINDOWOBSERVER module updates the overall dimensions defining the widget model, and uses all of this information to output the widget.

Returning to FIG. 2, a selection of a second service is received via the widget composition platform (S204). As described above with respect to FIG. 4, the first selected service 401 is the ASX Gains service, which uses an ASX-Service Requestor component, an ASX-Interpreter component and a generic table renderer component ("GENERICT-ABLERENDERER") that is capable of rendering tables based on receiving appropriately-formatted data. To populate the table, the ASX-Service Requestor component reads the content of the ASX website and sends the raw data to the ASX-Interpreter component. The ASX-Interpreter component fills the SERVICEDataMODEL object 507 by parsing the HTML code of the raw data. The generic table renderer component is used to show a table representation of the SERVICEDataMODEL object 507 in the appropriate service window.

The second service 402 is a GOOGLE® News service, which uses an RSS-Service Requestor component, an RSS-Interpreter component and the generic table renderer component. When the second service 402 is dropped onto the widget output region 301, the associated service window is registered in the WINDOWOBSERVER module and in the WIDGETOBJECTMANAGER module. After the dragable service window has been created, the RSS-Service Requestor component is invoked, thereby reading the RSS feed. Since RSS uses XML, the RSS-Interpreter component processes the returned XML and fills the SERVICEDataMODEL object 507. The generic table renderer receives the SERVICEDataMODEL object 507, and renders a table representation of the data in the appropriate service window.

Two services may be dragged from the expandable tree control 309 positioned to the left of the widget output region 301. For each of services dragged from the expandable tree control 309 to the widget output region 301, a new service mediator instance is created to instantiate the associated service requestor components, interpreter components, and renderer components. These components are assigned to the service mediator instance when the service is initially defined and saved to the service repository.

A selection connecting an output of the first service or design element with an input of the second service or design element is received via the widget composition platform (S205). A CONNECTOR object for an event may be generated, the CONNECTOR object adding the input of the second service as a listener and adding the output of the first service as a caller.

When two or more services or design elements are selected for placement on the widget output region 301, they may be connected for contextualization purposes via the user interface. Each service has a number of output and input ports which may have associated symbols, such as arrow symbols for inputs, and dots for outputs. The user can connect the output of one service or design element to the input of another service or design element by simply drawing a line between the ports using a mouse or other input device.

Once a valid connection has been drawn on the service window or design element window, the WIDGETOBJECTMANAGER module logically connects the two services by creating a CONNECTOR object associated with a specific event, such as an ONBLUR event, an ONCHANGE event, an ONCLICKEVENT, an ONFOCUS event, an ONLOAD event, an ONMOUSEOVER event, an ONSELECT event, an ONSUBMIT event, an ONUNLOAD event, a keystroke event, or other event. The CONNECTOR object adds the input port on the receiving service port as a listener and the delivering service's output port as a caller, and the WIDGETOBJECTMANAGER module adds the CONNECTOR object to the delivering service. An array, identifying the at least the first service 401, a position and a size of each of the at least the first service 401, and connections between the first service 401 and second service 402 may be transmitted via the WINDOWOBSERVER module.

A valid connection refers to a connection between an output port of a first service or design element and an input port of a second service or design element. A connection from the output of a service that outputs names to the input of a service that returns addresses based on receiving a name is an example of a valid connection. A connection from the output of a service to the input of the same service is an example of an invalid connection. In a further example, a valid connection refers to a connection between an output of a first service or design element that outputs a specific type or format of data, and an input of a second service or design element that accepts that specific type or format of data. A valid connection may also refer to the graphical representation of such an underlying connection between ports, and would be visualized, for example, by an arrow drawn between an output control on a first service window (associated with an output port of the first service) and an input control on a second service window (associated with an input port of the second service). Other types of invalid connections are connections that originate from the input of a service, or connections that go from the output of one service to the output of another service.

Similarly, a valid selection is an automated or manual input, such as a mouse event or keystroke, that results in the definition or association of a valid connection. Thus, a mouse event that attempts to connect an output control of a service window to an input control of the same service window would create an invalid connection, and is thus an invalid selection.

Figure 6:
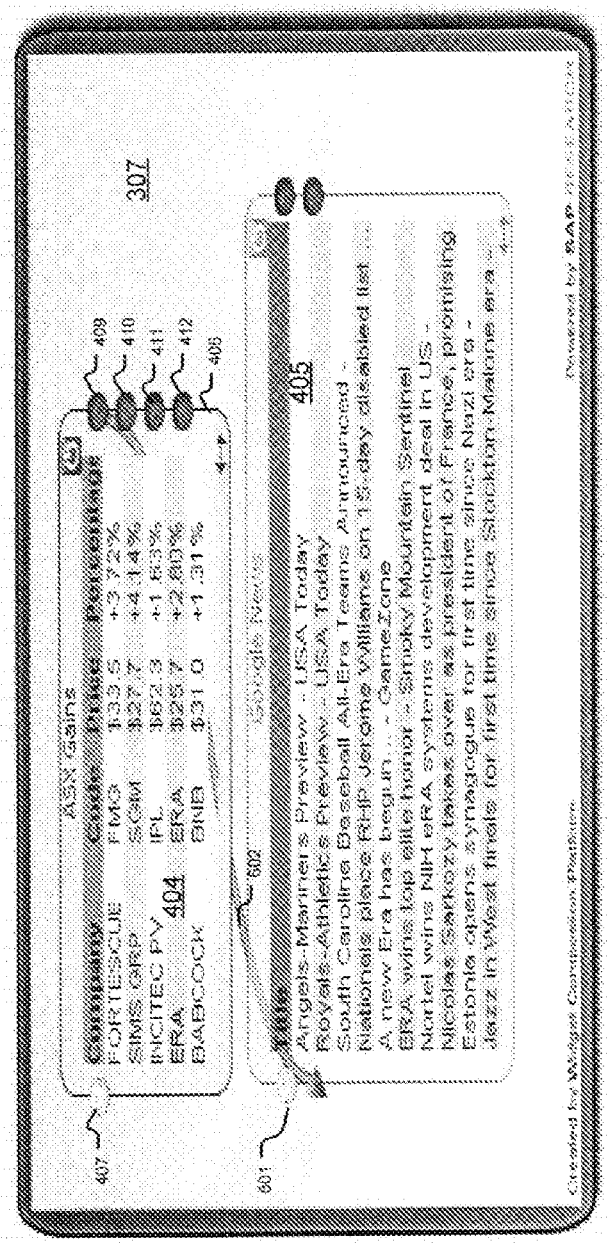

FIG. 6 depicts the widget output region 301 of the exemplary widget composition platform 300, in a state where the output of the first service window 404 is connected with an input of the second service window 405. In particular, based on a user selection via a pointing device, the output control 409, associated with the "company" column of first service 404 is connected with input port 601 of the second service 405. Thus, the output control 409 of the ASX Gains service window 404 is connected to the input control 601 of the GOOGLE® News service window 405, by simply drawing a line from the output port 409 (associated with the company name) of the ASX service 404 to the input control 601 of the GOOGLE® News service window 405.

Furthermore, and also based on this user selection, an arrow connector 602 is displayed to visually connect the two port controls, enabling a user to easily view, modify or delete a representation of the connection. In this particular example, depending upon various events, company name data associated with the "company" column of the first service 404 may be selectively output from the first service, and automatically input as an input parameter to the second service 405 as a basis for a query or other contextualization using the second service 405.

If the user mouses-over, clicks on, tabs to, or otherwise selects to the company "Sims Grp" or "Babcock," these actions may constitute events that trigger the output of the "Sims Grp" or "Babcock" company names to the second service 402. Based upon receiving these company names from the first service 401, the second service 402 may look up "Sims Grp" or "Babcock" in using the GOOGLE® News service to determine the reasons or cause of the stock rise, thereby contextualizing the data output by the first service 401.

It is verified whether the user selection connecting the output of the first service or design element with the input of the second service or design element is valid, using a LINEMANAGER module (S206). A connection from an output of a service or design element into the input of the same service or design element is an example of an invalid connection. A representation of the selection connecting the output of the first service with the input of the second service may be output, via the LINEMANAGER module, if the selection connecting the output module of the first service with the input of the second service is verified to be valid.

The LINEMANAGER module verifies that the connection is valid and then draws the line. The line is just the visual representation of the event-based connection of the two services in the underlying model. To establish this connection, the WIDGETOBJECTMANAGER is called, to determine, for example, if the first service 401 (the ASX Gains service) already has a CONNECTOR object for the specified event (i.e. the MOUSEOVER event).

If the first service 401 already has a CONNECTOR object for the specified event, that CONNECTOR object is used or modified to define the connection between services. If the first service 401 does not have a CONNECTOR object for a specified event, then a new CONNECTOR object is created. In the FIG. 6 example, the CONNECTOR object associated with the output control 409 ads the input control 601 as a listener. This CONNECTOR object is assigned (or re-assigned) to the MOUSEOVER event, such that data selected by the MOUSEOVER event is sent to the appropriate output port when a MOUSEOVER event is triggered.

Thus, the CONNECTOR object connects services or design elements of the widget, where each CONNECTOR object includes an array of listeners and callers. Upon detecting an occurrence of an event, the CONNECTOR object calls the registered listeners. Upon detecting the destruction of a listener, such as when a service window corresponding to a listener is deleted in the design mode, the CONNECTOR object removes the listeners from the array associated with the caller. The CONNECTOR object may also manage all visible service mediator instances or design elements instances, and the visible representations of their connection, as well as the destruction of various widget objects.

Figure 7:
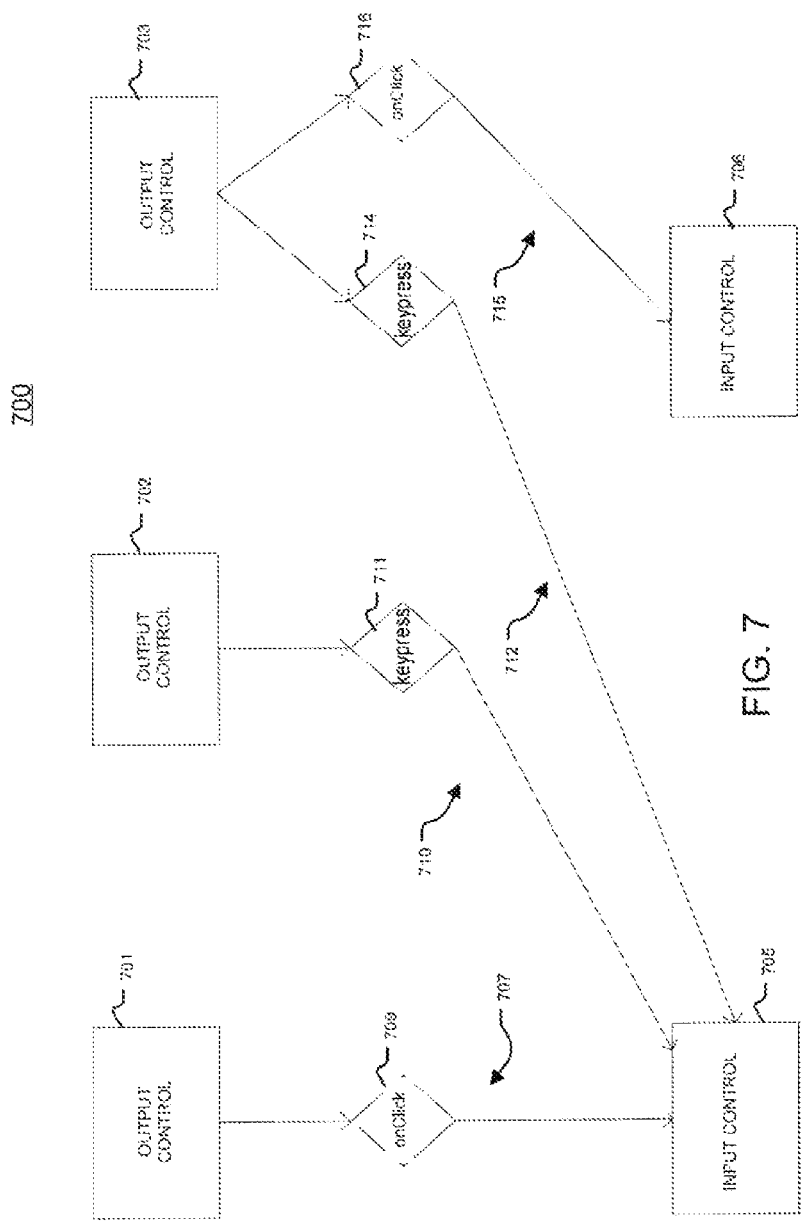
FIG. 7 is a block diagram illustrating an exemplary relationship between callers, events, and listeners.

FIG. 7 is a block diagram illustrating an exemplary relationship between callers, events, and listeners. In particular, output controls 701 to 703 may be associated with different output ports of a single service window, may each be associated with an output port of three different service windows, or may be associated with some combination thereof. Similarly, each of input controls 705 and 706 may be associated with an input port of two different service windows, or the input controls 705 and 706 may both be associated with a single input port or multiple input ports of the same service window.

In the FIG. 7 example, a CONNECTOR object 707 stores an array defining the input control 705 as a listener of the caller output control 701, based on the occurrence of an ONCLICK event 709 at the service window of the output control 701. A CONNECTOR object 710 stores an array defining the input control 705 as a listener of the caller output control 702, based on the occurrence of a keypress event 711 at the service window of the output control 702. A CONNECTOR object 712 stores an array defining the input control 706 as a listener of the caller output control 703, based on the occurrence of a keypress event 714 at the service window of the output control 703. A CONNECTOR object 715 stores an array defining the input control 706 as a listener of the caller output control 703, based on the occurrence of an ONCLICK event 716 at the service window of the output control 703.

In this regard, a single caller output port may be associated with multiple listener input ports, depending upon the assignment and occurrence of different events. Conversely, a single listener input port may also be associated with multiple caller output ports, based upon a similar event assignment approach. Services and design elements may thus be connected using events, such as a mouse-over within a service window that provides information about the top listed stocks, thereby causing another service window to dynamically retrieve and news based on a moused-over stock symbol in a different region of the widget.

Returning to FIG. 2, a selection of a widget engine is received via the widget composition platform (S207). Since several different widget engines may be used to implement a widget, such as the YAHOO!® widget engine or the MICROSOFT VISTA® gadget engine, the user is presented with the opportunity to select which widget engine suits their needs or desires. In FIG. 3, for example, the service repository region 302 also includes controls 311 to 313, that enables the selection of the YAHOO!® widget engine, the MICROSOFT VISTA® gadget engine, or the GOOGLE® gadget engine, respectively, although other widget or gadget engines could also be added or substituted, and other types of controls could be used to accept such a selection.

Thus, the widget composition platform provides multiple deployment options for designed widgets, as well as an interactive runtime environment that enables a user to assemble different service to a widget. Within the web browser environment, a compatibility layer is used to enable the widget composition platform to run code used by various widget engines, providing the ability to run the same automatically-generated code within the enhanced widget composition platform 300 or outside of the enhanced widget composition platform 300 using the selected widget engine.

Code is automatically generated based on receiving the selections of the first service or design element, the second service or design element, and/or the widget engine (S209). When invoked by the selected widget engine, the code implements a widget that is operable to communicate with the first and/or second services. Invocation generally refers to the process of carrying out instructions of a computer program, and encompasses running, calling, accessing, loading and/or executing code.

The selection of the widget engine via the widget composition platform effectuates the deployment or output of the widget. The current state of the widget is determined via the data stored in the WINDOWOBSERVER module, where this data is sent back to the server to assemble the generated the appropriate code and generated associated files.

The code may further be automatically generated based on receiving a selection of a design element defining an appearance of the widget or for performing a non-service-related function, based on receiving a selection of a second service via the web-based widget composition platform, or based on receiving a selection connecting an output of the first service with an input of the second service via a WIDGETOBJECTMANAGER module.

The code is invoked in a browser environment using a compatibility layer that emulates at least a portion of the functionality of the selected widget engine, thereby simulating the widget in the widget composition platform (S210). To enable a widget-like behavior within the web-browser environment, a widget engine is simulated via a compatibility layer, which is a JavaScript file that implements at least a portion of the functions of one or more widget engines. In this manner, it is possible to use the same or similar code prior to deployment in the web browser, as well as after deployment in the output widget itself.

Figure 8:
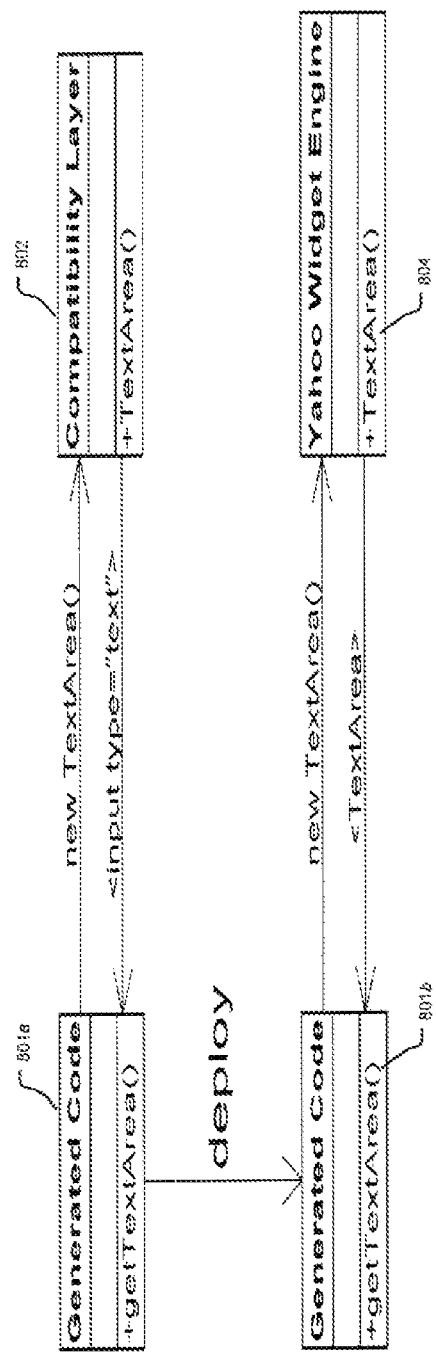
FIG. 8 is a block diagram illustrating an exemplary relationship between the generated code, and responses generated by the compatibility layer and the widget engine.

FIG. 8 is a block diagram illustrating an exemplary relationship between the generated code and the responses generated by the compatibility layer and the widget engine. For a text field to be created in a web-browser environment using JavaScript, a new <INPUT> component would need to be created, and properties would be assigned to the component. Although the YAHOO!® widget engine does not recognize an <INPUT> component, it does understand the analogous <TEXTAREA> component, which is not recognized by JavaScript. Therefore, the compatibility layer implements the <TEXTAREA> component in the web-browser environment. In this manner, the automatically-generated code can issue a <TEXTAREA> component, regardless of whether the code is being invoked in the web-browser environment via the compatibility layer, or invoked using the selected widget engine.

In FIG. 8, block 801a represents the automatically-generated code prior to deployment of the widget, and block 801b represents the automatically-generated code after deployment. Instead of generating an <INPUT> component within the browser environment, the block 801a generates a <TEXTAREA> component. This <TEXTAREA> component is intercepted by the compatibility layer 802, which in this example emulates the YAHOO!® widget engine 804, and which generates an <INPUT> component in response that is understood by the web browser. Once deployed, and to perform the same function, the block 801b generates the same <TEXTAREA> component, which is understood by the YAHOO! ® widget engine 804.

By implementing the <TEXTAREA> component within the web browser via the compatibility layer, the same automatically-generated code may be used within the web browser prior to deployment, and by the widget engine following deployment. Upon deployment, the compatibility layer code is not output with the automatically-generated code, and the widget engine receives and processes the automatically-generated code. This code could include, for example, components such as the <TEXTAREA> component. As a result, the code contained in blocks 801a and 801b may be the same, and may just use a different reference.

In another example, the YAHOO!® widget does not recognize HyperText Markup Language (HTML) elements such as <TABLE>, <SPAN>, <A>, which are used to represent the table in the web browser environment, however it does recognize the analogous <TEXT> and <FRAME> elements. Accordingly, the compatibility layer stores both a TEXT( ) and FRAME( ) implementation, allowing a generic table renderer to generate <TEXT> and <FRAME> elements within the web browser environment, without regard for how the elements are parsed, and without modifying these elements after deployment. Specifically, when invoked within the widget composition platform, the <TEXT> and <FRAME> elements return an HTML <TABLE>. When invoked by the YAHOO!® widget engine, the widget engine recognizes these native elements and responds accordingly.

Figure 9:
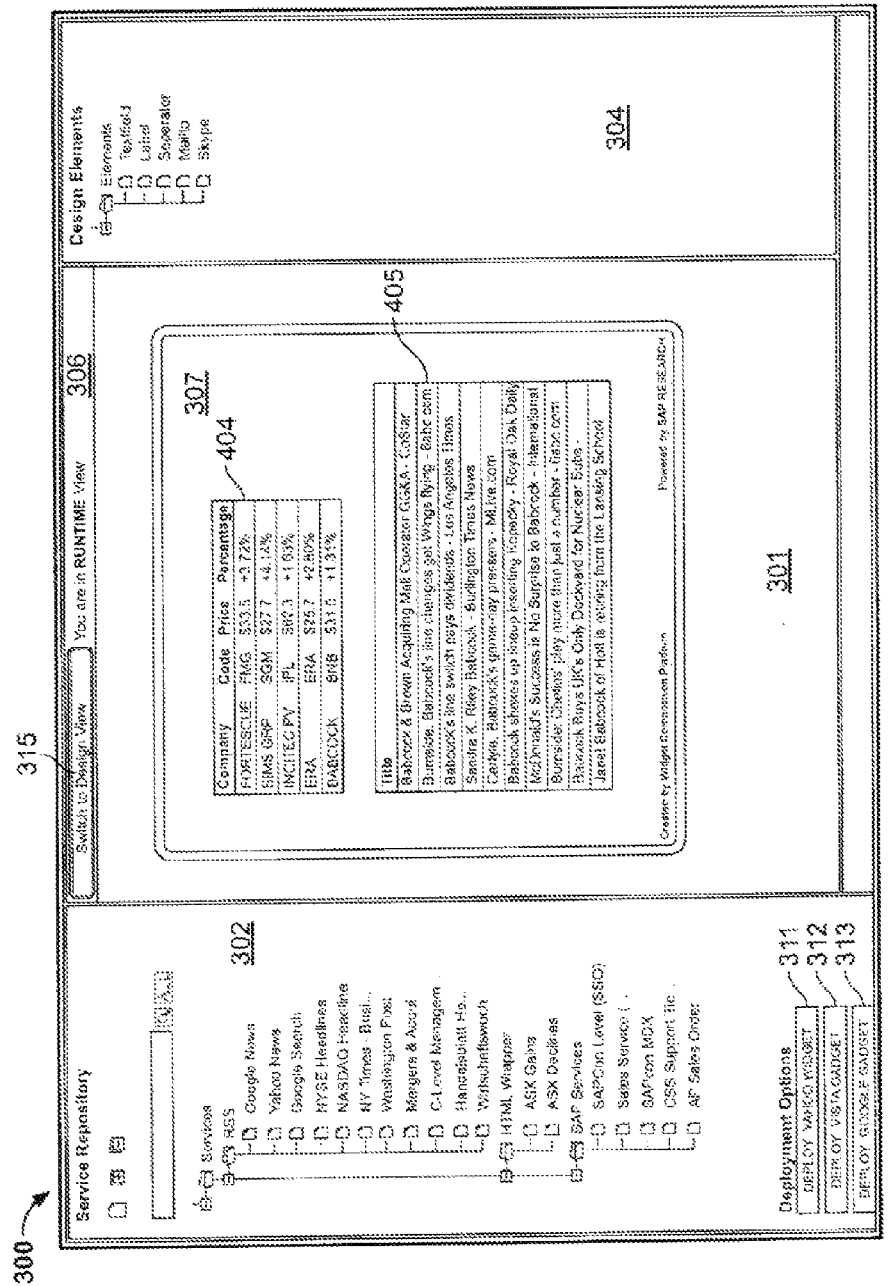

FIG. 9 depicts the exemplary widget composition platform 300, in a state where the widget is previewed. In particular, when the mode selector 315 is selected, the widget composition platform toggles from design mode to preview (or 'runtime') mode, where the widget is simulated. As indicated above, even in the design mode the widget composition platform communicates with the selected service, and the various service windows are populated with real-time data, as configured by the user or as predefined.

In the preview mode, however, certain visual elements of the widget object 307 that are not shown in the output widget are removed, highlighted, or made transparent. For instance, and as shown in FIG. 9, in the preview mode, the input and output controls associated with the various service windows are removed, as are the expandable frames (and associated controls) that define the bounds of the service windows. Furthermore, representations of the connections between the various services may also be hidden, unless it is desired to show these connections. In a further non-depicted implementation, regions of the widget composition platform, such as service repository region 302 or design element repository region 304 are also hidden from view in the preview mode.

First data from the first service or design element is received (S211). The widget may be operable to communicate with the first service via a SOAP call or a HTTP call. Data may be received from the first service, and the data may be displayed via the widget. In FIG. 7, for example, the first service 401 receives data related to the top five ASX Gains, and displays the received data in a table format in the first service window 404. Since the first service window 404 does not have other services or design elements connected to input control 407, the data received by the first service 401 is generic, uncontextualized data.

An ENVELOPE object is sent from the output of the first service or design element to the input of the second service or design element based on upon detecting an event, the ENVELOPE object encapsulating output values from the first service or design element (S212). An ENVELOPE object may be sent from the caller to the listener based on upon detecting the event, the ENVELOPE object encapsulating output values from the caller. In FIG. 7, for example, upon detecting a mouse-over event on the company name "Babcock" in the first service window 404, an ENVELOPE object including this term is sent as an input to the second service. Thus, the second service uses the term "Babcock" as an input parameter.

Once the event is triggered by the delivering service, the CONNECTOR object for this event calls all the listeners by receiving the output data or values from the registered ports of the delivering objects. The output data is encapsulated in an ENVELOPE object, and sends the ENVELOPE object to the receiving service. Among other data, the ENVELOPE object stores an array of receiver ports ("listeners") and the data which was requested for them, formatted as:

array[receiverPort]=data.

Second data is received from the second service or design element based on receiving the ENVELOPE object at the input of the second service (S214), and the second data is output (S215). The listener receives and accesses the ENVELOPE object, and assigns the output data or values to its input ports. After the envelope content has been assigned to the appropriate input ports, the second service is re-invoked and re-rendered using the associated input data.

As indicated above, when the mouse pointer is detected over the company name "Babcock" in the ASX Gains service window 404, the MOUSEOVER event is triggered. The ASX Gains service 401 determines that a CONNECTOR object is defined for the MOUSEOVER event, and a new ENVELOPE object is instantiated which stores an array of receiver ports.

Since a connection was created by the user between the output control 409 of the ASX Gains (first) service 401 and the input control 601 of the GOOGLE® News (second) service 402, and the ASX Gains service output control 409, array[1] associated with the output control 409 of the ASX Gains service stores the output data ("Babcock"). An ENVELOPE object is sent to the GOOGLE® News service, which accesses the ENVELOPE object and assigns the value "Babcock" to port associated with the input control 601. The GOOGLE® News service is then re-invoked, and receives, processes and displays the results for the new GOGGLE® News search for the term "Babcock."

The code is uploaded to a user (S216), thereby ending the process 200 (S217). The code may be output, for example, by uploading the widget to a user device. The current state of the widget is determined via the data stored in the WINDOWOBSERVER module, where this data is sent back to the server to assemble the generated the appropriate code, which is returned to the web browser in a data stream. This data stream, for example, outputs the widget files in an archive (e.g. .ZIP) file for download by the user.

After the composition of a widget is finished, it can be deployed as a widget that is tailored for any one of a number of widget engines. The deployed widget is a snapshot of the widget in the WYSIWYG environment of the web browser. The deployment manager module utilizes the compatibility layer to generate widgets or gadgets based on the selected services. The users can thus create widgets using a WYSIWYG environment, and download, transmit to others, or otherwise deploy the widget.

Figure 10:
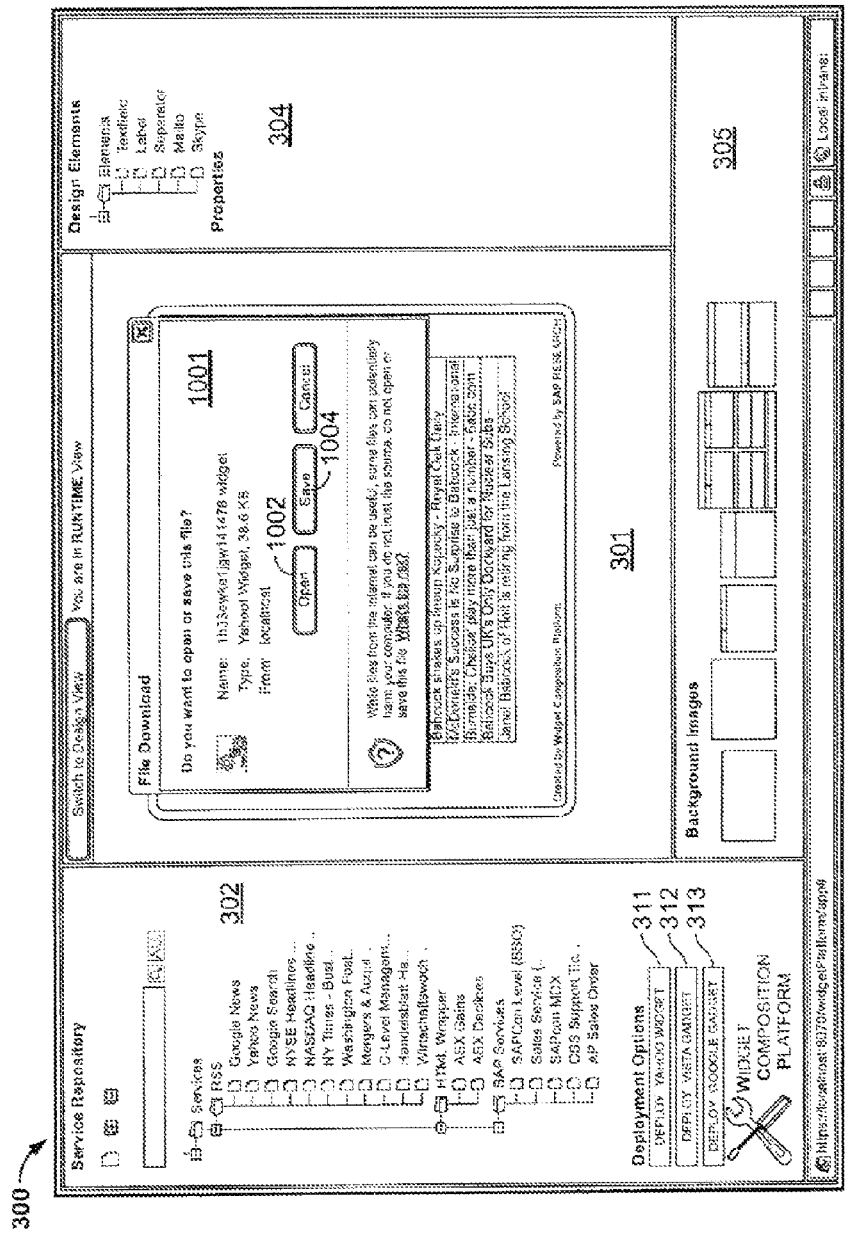

FIG. 10 depicts the exemplary widget composition platform 300, in a state where the widget is output to the user. In particular, upon selecting the control 311, the current state of the widget is determined via the data stored in the WINDOWOBSERVER module. This data is sent back to the server to assemble the generated the appropriate code for a YAHOO!® widget. The returns the code to the web browser in a data stream, where the receipt of the code causes the web browser to display a menu 1001. Using the menu, the user can opt to invoke the code which is appropriately formatted as a .WIDGET file, using an 'open' control 1002, or save the code, using 'save' control 1004.

Figure 11:
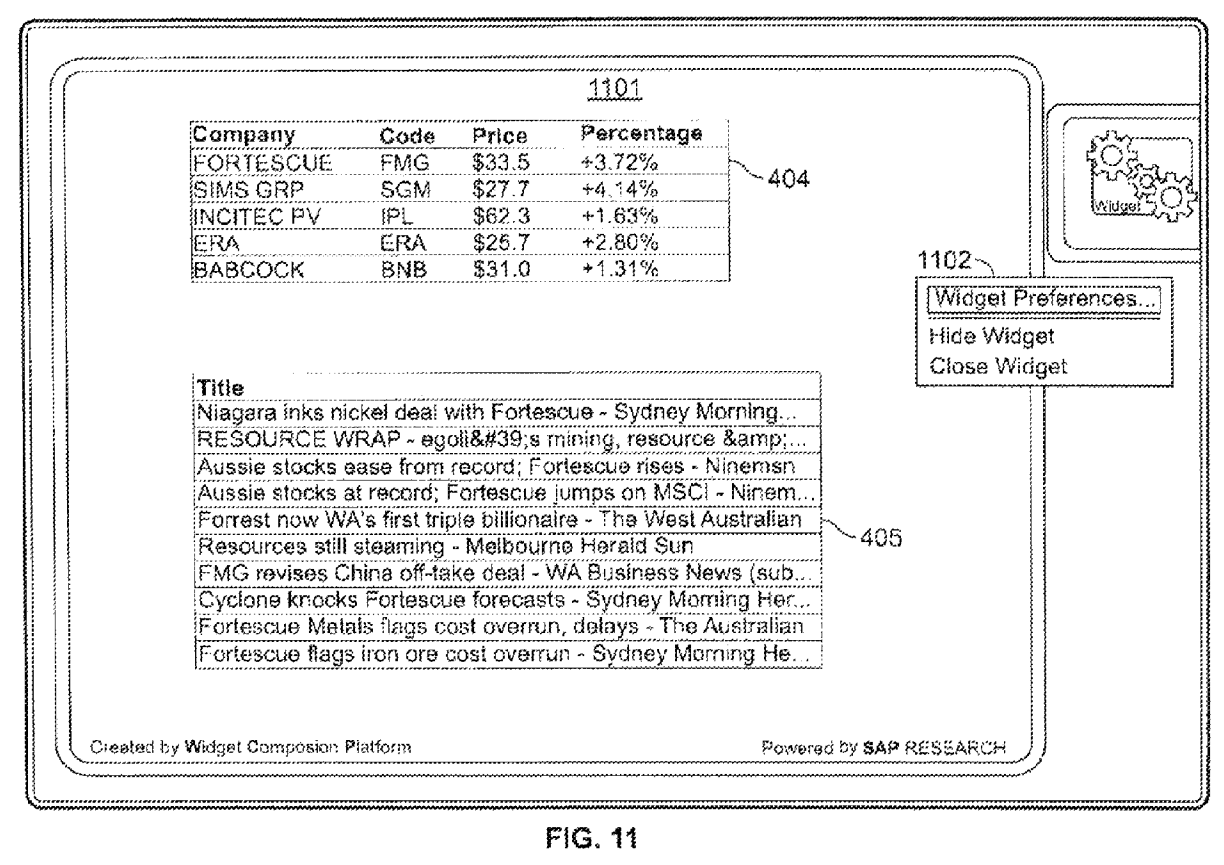

As shown in FIG. 11, upon selecting the 'open' control 1002 (or by saving and later executing the saved code), the widget 1101 is invoked. As determined by the particular widget engine, widget preferences may also be changed using widget preference menu 1102. Since the widget 1101 was designed in a WYSIWYG environment, it appears similar or identical to the widget object 307 designed via the enhanced widget composition platform 300.

Figure 12:
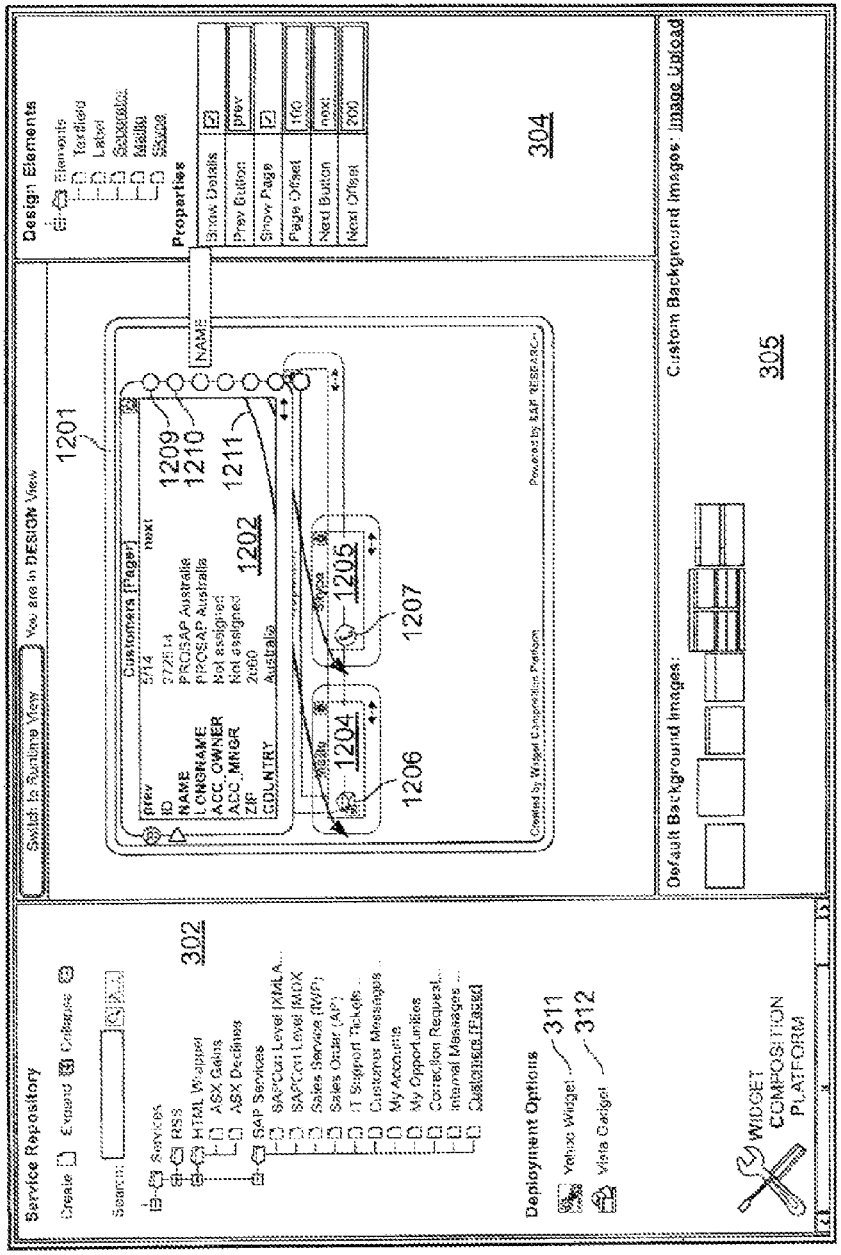
Figure 13:
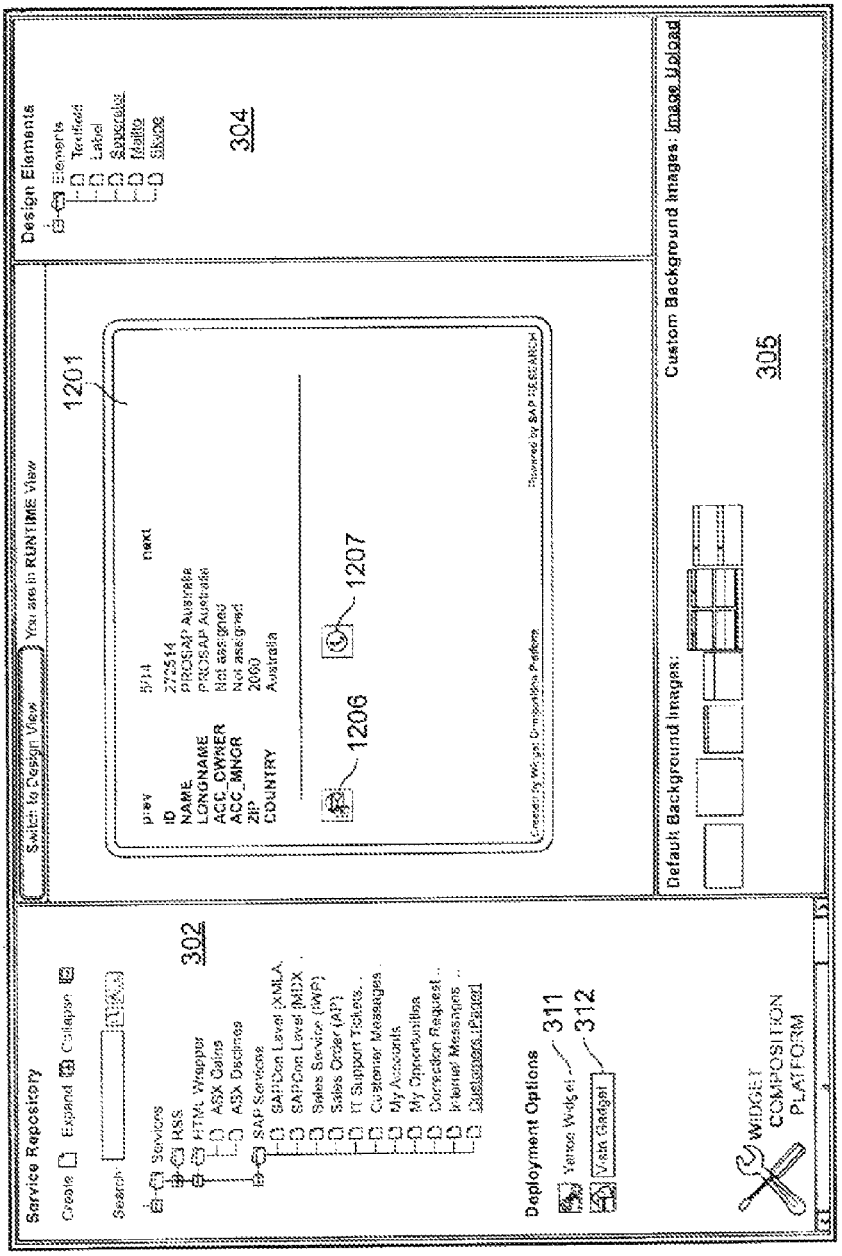

FIGS. 12 and 13 also depicts the exemplary widget composition platform 300, which includes functional design elements that cause the widget to establish a communication link, in a design mode and a preview mode, respectively. Briefly, a widget object 1201 includes a first service window 1202, and design element windows 1204 and 1205. The design element window 1204 includes a mailto: icon 1206, and the design element window 1205 includes a SKYPE® icon 1207.

The service window 1202 includes an output control 1209 that outputs data received from the service associated with the service window 1202 (such as email address data) to the design element window 1204. A MOUSEOVER or ONCLICK event on the email address in the service window 1202 or on the mailto: icon 1206 causes an email message to be generated to that email address. Similarly, the service window 1202 includes an output control 1210 that outputs data received from the service associated with the service window 1202 (such as telephone number data) to the design element window 1205. A MOUSEOVER or ONCLICK event on the telephone number in the service window 1202 or on the SKYPE® icon 1207 causes a telephone call to be placed to that telephone number, using the SKYPE® service. In FIG. 13, various design elements, such as arrow connector 1211, are omitted to provide a more accurate depiction of the output widget.

The widget output by the enhanced widget composition platform may be used to generically define scenarios, for example to detect patterns based upon the dynamic selection of various linked data, which is contextualized on-the-fly. Using the intuitive, WYSIWYG interface, data may be contextualized in a non-technical manner, in a single platform, without requiring specialized programming skills. In this regard, users may be able to define scenarios that may be relevant to them, in a manner that allows the users to permanently access the resulting information. Thus, it can be said that the deployed widget performs a predefined data contextualization, on demand.

Furthermore, the enhanced widget composition platform prepares the requisite scripts and code to allow for the transmission and reception of data from services, and to effectuate user authentication between the user and servers hosting the services. Thus, the user is no longer required to manually generate the code that performs the underlying processes, making widget creation easier, even for a technologically-inexperienced user.

The security framework provides functionality to retrieve data from data sources allowing single-sign-on, or federated authentication. The security framework also manages differences between the security mechanisms within the runtime environment and the deployed widgets, allowing the widget to support secure service calls. Furthermore, the widget may detect whether a user is logged in via federated authentication, and selectively display data if a user has the required authorization.

Unlike other approaches, the enhanced widget composition platform provides for the exchange of data from different data sources and types of data sources, including for instance RSS feeds, web services and external HTML pages. Furthermore, the enhanced widget composition platform provides the ability to save the widget as a portable piece of software, allowing communities or content specialists to create services that others can use, without any technical skills or deep content knowledge.

Figure 14:
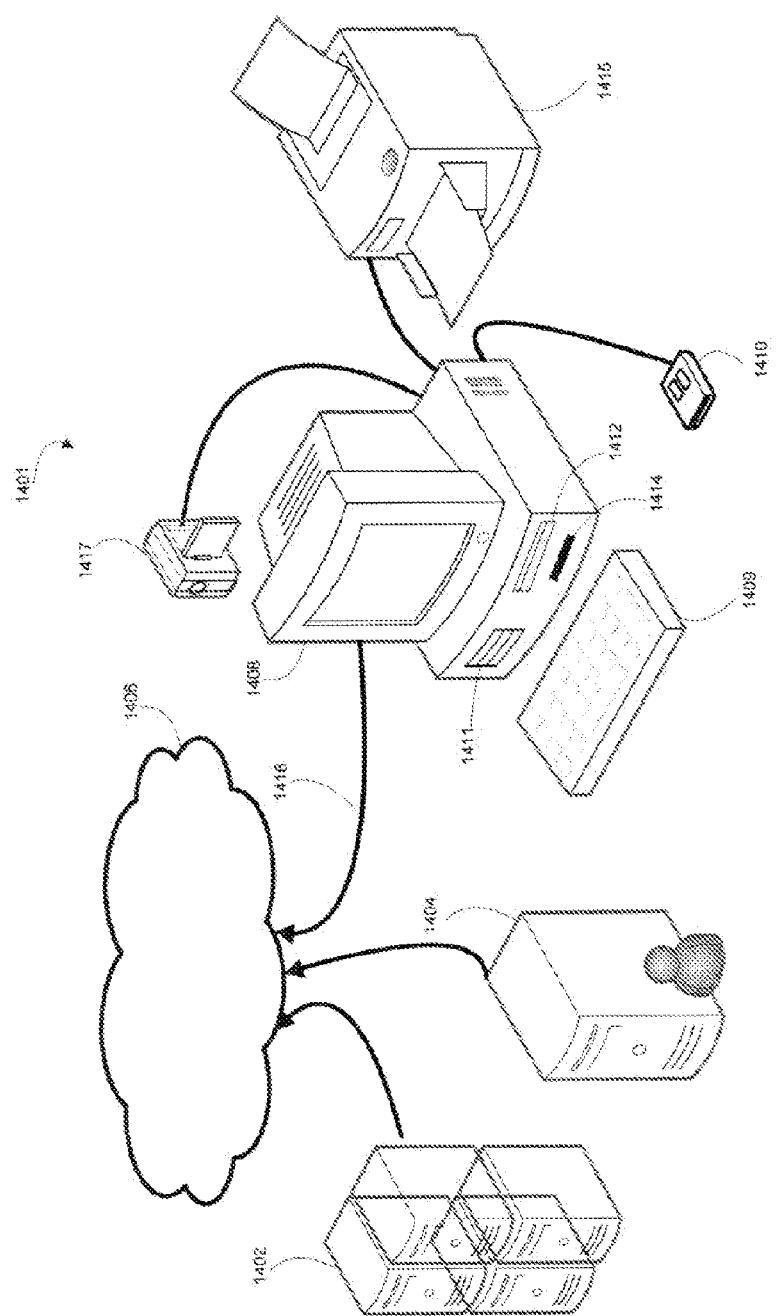
FIG. 14 illustrates the exterior appearance of an exemplary system, according to another general implementation.

FIG. 14 illustrates the exterior appearance of an exemplary system 1400 that implements the enhanced widget composition platform, according to another general implementation. Briefly, the system 1400 includes a device 1401, a server 1402 that includes an enhanced widget composition platform application, and a server 1404 that includes at least one service. As is described in more detail, below, the device 1401 includes a processor configured to generate code based on receiving a selection of at least a first service and a widget engine via a web-based widget composition platform, the code, when invoked by the selected widget engine, implementing a widget that is operable to communicate with the first service.

In more detail, the hardware environment of the device 1401 includes a display monitor 1408 for displaying text and images to a user, a keyboard 1409 for entering text data and user commands into the device 1401, a mouse 1410 for pointing, selecting and adjusting objects displayed on the display monitor 1408, a fixed disk drive 1411, a removable disk drive 1412, a tape drive 1414, a hardcopy output device 1415, a computer network connection 1416, and a video and audio detector 1417.

The display monitor 1408 displays graphics, images, and text that comprise the display for the software applications used by the device 1401, as well as the operating system programs necessary to operate the device 1401. A user uses the keyboard 1409 to enter commands and data to operate and control the computer operating system programs, the web browser, and/or the widget engine. The user uses the mouse 1410 to select and adjust graphics and text objects displayed on the display monitor 1408 as part of the interaction with and control of the device 1401 and applications running on the device 1401. The mouse 1410 is any type of pointing device, and may be a joystick, a trackball, a touch-pad, or other pointing device.

The video and audio detector 1417 allows the device 1401 to capture digital images and/or audio, and may be a scanner, a digital camera, a digital video camera, a microphone or other digital input device. Software used to provide for the enhanced widget composition platform is stored locally on computer readable memory media, such as the fixed disk drive 1411.

In a further implementation, the fixed disk drive 1411 itself may include a number of physical drive units, such as a redundant array of independent disks ("RAID"), or may be a disk drive farm or a disk array that is physically located in a separate computing unit. Such computer readable memory media allow the device 1401 to access computer-executable process steps, application programs and the like, stored on removable and non-removable memory media.

The wireless or wireline computer network connection 1416 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 1406 may be one or more of a LAN network, a corporate or government WAN network, the Internet, or other network.

The computer network connection 1416 uses a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, a near field communications ("NFC") connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The removable disk drive 1412 is a removable storage device that is used to off-load data from the device 1401 or upload data onto the device 1401. The removable disk drive 1412 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, an external hard disk drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 1411 or on removable media for the removable disk drive 1412.

The tape drive 1414 is a tape storage device that is used to off-load data from the device 1401 or to upload data onto the device 1401. The tape drive 1414 may be a quarter-inch cartridge ("QIC"), 4 mm digital audio tape ("DAT"), 8 mm digital linear tape ("DLT") drive, or other type of tape.

The hardcopy output device 1415 provides an output function for the operating system programs and applications. The hardcopy output device 1415 may be a printer or any output device that produces tangible output objects, including textual or image data or graphical representations of textual or image data. While the hardcopy output device 1415 is depicted as being directly connected to the device 1401, it need not be. For instance, the hardcopy output device 1415 may be connected to device 1401 via a network interface, such as a wireline or wireless network.

Furthermore, although the device 1401 is illustrated in FIG. 14 as a desktop PC, in further implementations the device 1401 may be a laptop, a workstation, a midrange computer, a mainframe, an embedded system, telephone, a handheld or tablet computer, a PDA, or other type of computer.

Figure 15:
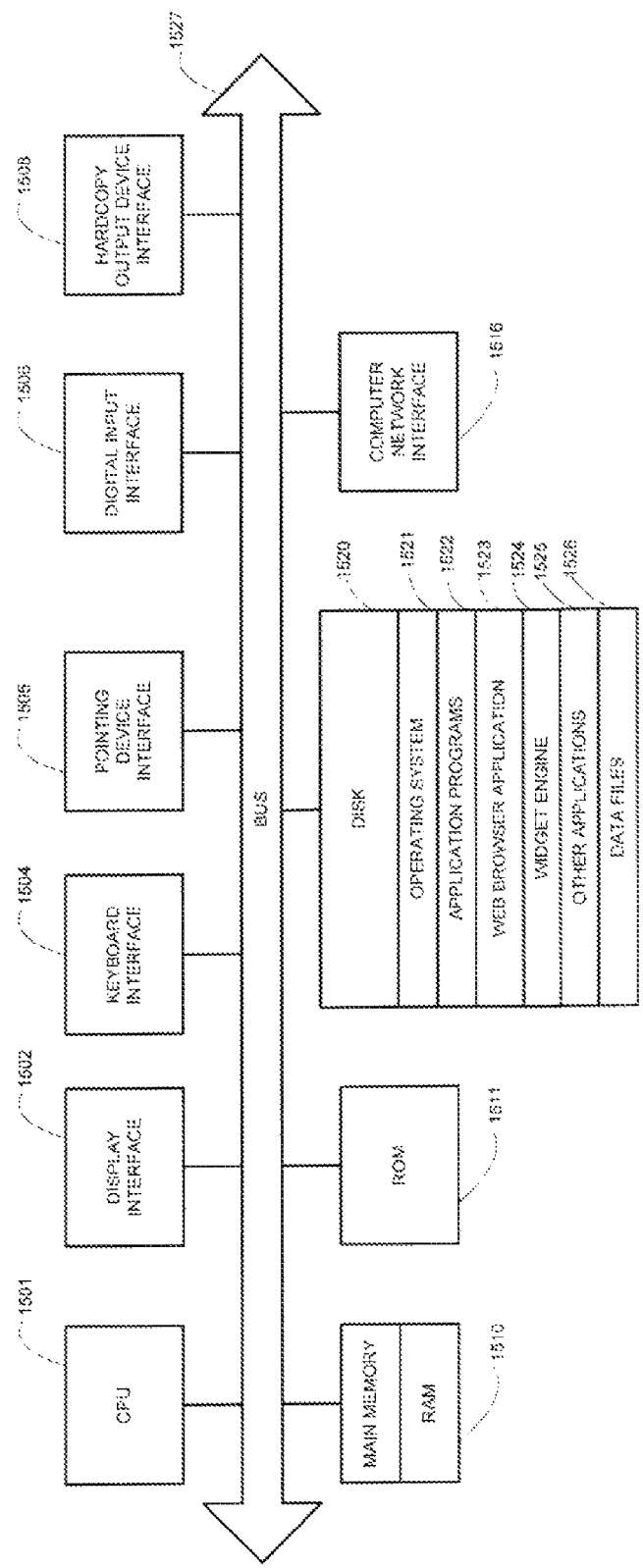
FIG. 15 is a block diagram illustrating the internal architecture of the device shown in FIG. 14.

FIG. 15 is a block diagram illustrating the internal architecture of one computer shown in FIG. 14. The computing environment includes a computer central processing unit ("CPU") 1501 where the computer instructions that comprise an operating system or an application are processed; a display interface 1502 which provides a communication interface and processing functions for rendering graphics, images, and texts on the display monitor 1408; a keyboard interface 1504 which provides a communication interface to the keyboard 1409; a pointing device interface 1505 which provides a communication interface to the mouse 1410 or an equivalent pointing device; a digital input interface 1506 which provides a communication interface to the video and audio detector 1417; a hardcopy output device interface 1508 which provides a communication interface to the hardcopy output device 1415; a random access memory ("RAM") 1510 where computer instructions and data are stored in a volatile memory device for processing by the computer CPU 1501; a read-only memory ("ROM") 1511 where invariant low-level systems code or data for basic system functions such as basic input and output ("I/O"), startup, or reception of keystrokes from the keyboard 1409 are stored in a non-volatile memory device; a storage 1520 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 1521, application programs 1522 (including web browser application 1523, widget engine 1524, and other applications 1525 as necessary) and data files 1526 are stored; and a computer network interface 1516 which provides a communication interface to the network 1406 over the computer network connection 1416. The constituent devices and the computer CPU 1501 communicate with each other over the computer bus 1527.

The widget engine 1524 may be a TAFRI™ widget engine, a MICROSOFT gadget engine such as the WINDOWS SIDEBAR® gadget engine or the KAPSULES™ gadget engine, a YAHOO!® widget engine such as the KONFABULTOR™ widget engine, the APPLE® DASHBOARD® widget engine, the GOGGLE® gadget engine, the KLIPFOLIO® widget engine, an OPERA™ widget engine, the WIDSETS™ widget engine, an SAP® widget or gadget engine, a proprietary widget or gadget engine, or other widget or gadget engine the provides host system software for a physically-inspired applet on a desktop.

Briefly, a computer program product is tangibly embodied in disk 1520, a machine-readable storage medium. The computer program product includes instructions that, when read by a machine, operate to cause a data processing apparatus to generate code based on receiving a selection of at least a first service and a widget engine via a web-based widget composition platform, the code, when invoked by the selected widget engine, implementing a widget that is operable to communicate with the first service.

The RAM 1510 interfaces with the computer bus 1527 so as to provide quick RAM storage to the computer CPU 1501 during the execution of software programs such as the operating system application programs, and device drivers. More specifically, the computer CPU 1501 loads computer-executable process steps from the fixed disk drive 1411 or other media into a field of the RAM 1510 in order to execute software programs. Data is stored in the RAM 1510, where the data is accessed by the computer CPU 1501 during execution.

Also shown in FIG. 15, the device 1401 stores computer-executable code for a operating system 1521, and application programs 1522 such as word processing, spreadsheet, presentation, gaming, web browsing, JavaScript engine, or other applications. Although it is possible to provide for the enhanced widget composition platform using the above-described implementation, it is also possible to implement the functions according to the present disclosure as a dynamic link library ("DLL"), or as a plug-in to other application programs such as an Internet web-browser such as the APPLE® SAFARI® web browser or the MICROSOFT® INTERNET EXPLORER® web browser.

The computer CPU 1501 is one of a number of high-performance computer processors, including an INTEL® or AMD processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 1501 is more than one processing unit, including a multiple CPU configuration found in high-performance workstations and servers, or a multiple scalable processing unit found in mainframes.

The operating system 1521 may be APPLE® MAC OS X® for INTEL® and POWERPC® based workstations and servers; MICROSOFT® WINDOWS NT®/WINDOWS® 2000/WINDOWS® XP Workstation; MICROSOFT® WINDOWS VISTA®/WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers; SYMBIAN OS®, NEWTON®, IPOD®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 1521 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

While FIGS. 14 and 15 illustrate one possible implementation of a computing system that executes program code, or program or process steps, configured to effectuate enhanced widget composition, other types of computers may also be used as well.

As to formal matters, while the term "user" has been consistently used to describe an entity that interacts with these processes, such a generalization is also intended to describe multiple related or unrelated, living or automated entities or beings that interact with these processes at various different, overlapping or non-overlapping states. In a similar vein, the term "selection" is intended to denote throughout a manual selection by a human, an automatic selection by a non-human, or some combination thereof.

Finally, it is noted that, for the sake of brevity, the term "JavaScript" is intended to reference the SUN MICROSYSTEMS® JAVASCRIPT® programming language, and the term "XML" is intended to reference 'eXtensible Markup Language' throughout. Moreover, wherever the term "widget" is mentioned, the terms "gadget," "control," or "mini-application" may be substituted.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   transmitting instructions to a computing device to display a user interface of a web-based widget composition platform;
   receiving first user input comprising a selection of at least a first service and a second service, the first user input being received through the user interface;
   receiving second user input comprising i) a first connection of a first output of the first service with an input of the second service and ii) a second connection of a second output of the first service with the input of the second service, the second user input being received through the user interface;
   receiving third user input comprising a selection of a widget engine, the third user input being received through the user interface;
   automatically generating code based on the first service, the second service and the widget engine,
   wherein the code, when invoked by the widget engine, provides a widget that includes a first service window associated with the first service and a second service window associated with the second service, and that is operable to communicate with the first service and the second service to i) connect the first output of the first service to the input of the second service based on an occurrence of a first event and ii) connect the second output of the first service to the input of the second service based on an occurrence of a second event,
   wherein data presented in the second service window is contextualized based upon a user-selection of one of a plurality of data items displayed in the first service window; and
   transmitting the code for invocation in a browser environment using a compatibility layer that emulates the widget engine to simulate the widget in the widget composition platform.

2. The method of claim 1,
   wherein the web-based widget composition platform further comprises a design mode and a preview mode,
   wherein the first service is selected via the web-based widget composition platform, in the design mode, and
   wherein the widget is simulated via the web-based widget composition platform, in the preview mode.

3. The method of claim 1, further comprising creating a service mediator instance based on receiving the selection, the service mediator instance comprising a service requestor component, an interpreter component, and a render component.

4. The method of claim 3, wherein the interpreter component provides an interpreted model object based on data received from the service requestor component, and the renderer component renders a visual representation based on data of the interpreted model object.

5. The method of claim 1, wherein the code is further automatically generated based on receiving a selection of a design element defining an appearance of the widget or based on receiving a selection of a design element for performing a non-service-related function.

6. The method of claim 1, wherein connecting the first output of the first service to the input of the second service comprises sending an object from the first service to the second service in response to occurrence of the event.

7. A computer program product, tangibly stored in a non-transitory machine-readable medium, the computer program product comprising instructions that, when read by a machine, operate to cause a data processing to perform operations comprising:
   transmitting instructions to a computing device to display a user interface of a web-based widget composition platform;
   receiving first user input comprising a selection of at least a first service and a second service, the first user input being received through the user interface;
   receiving second user input comprising i) a first connection of a first output of the first service with an input of the second service and ii) a second connection of a second output of the first service with the input of the second service, the second user input being received through the user interface;
   receiving third user input comprising a selection of a widget engine, the third user input being received through the user interface;
   automatically generating code based on the first service, the second service and the widget engine,
   wherein the code, when invoked by the widget engine, provides a widget that includes a first service window associated with the first service and a second service window associated with the second service, and that is operable to communicate with the first service and the second service to i) connect the first output of the first service to the input of the second service based on an occurrence of a first event and ii) connect the second output of the first service to the input of the second service based on an occurrence of a second event,
   wherein data presented in the second service window is contextualized based upon a user-selection of one of a plurality of data items displayed in the first service window; and
transmitting the code for invocation in a browser environment using a compatibility layer that emulates the widget engine to simulate the widget in the widget composition platform.

8. The computer program product of claim 7,
   wherein the web-based widget composition platform further comprises a design mode and a preview mode,
   wherein the first service is selected via the web-based widget composition platform, in the design mode, and
   wherein the widget is simulated via the web-based widget composition platform, in the preview mode.

9. The computer program product of claim 7, wherein operations further comprise creating a service mediator instance based on receiving the selection, the service mediator instance comprising a service requestor component, an interpreter component, and a render component.

10. The computer program product of claim 9, wherein the interpreter component provides an interpreted model object based on data received from the service requestor component, and the renderer component renders a visual representation based on data of the interpreted model object.

11. The computer program product of claim 7, wherein the code is further automatically generated based on receiving a selection of a design element defining an appearance of the widget or based on receiving a selection of a design element for performing a non-service-related function.

12. The computer program product of claim 7, wherein connecting the first output of the first service to the input of the second service comprises sending an object from the first service to the second service in response to occurrence of the event.

13. A device comprising a processor configured to perform operations comprising:
   transmitting instructions to a computing device to display a user interface of a web-based widget composition platform;
   receiving first user input comprising a selection of at least a first service and a second service, the first user input being received through the user interface;
   receiving second user input comprising i) a first connection of a first output of the first service with an input of the second service and ii) a second connection of a second output of the first service with the input of the second service, the second user input being received through the user interface;
   receiving third user input comprising a selection of a widget engine, the third user input being received through the user interface;
   automatically generating code based on the first service, the second service and the widget engine,
   wherein the code, when invoked by the widget engine, provides a widget that includes a first service window associated with the first service and a second service window associated with the second service, and that is operable to communicate with the first service and the second service to i) connect the first output of the first service to the input of the second service based on an occurrence of a first event and ii) connect the second output of the first service to the input of the second service based on an occurrence of a second event,
   wherein data presented in the second service window is contextualized based upon a user-selection of one of a plurality of data items displayed in the first service window; and
transmitting the code for invocation in a browser environment using a compatibility layer that emulates the widget engine to simulate the widget in the widget composition platform.

14. The device of claim 13,
   wherein the web-based widget composition platform further comprises a design mode and a preview mode,
   wherein the first service is selected via the web-based widget composition platform, in the design mode, and
   wherein the widget is simulated via the web-based widget composition platform, in the preview mode.

15. The device of claim 13, wherein operations further comprise creating a service mediator instance based on receiving the selection, the service mediator instance comprising a service requestor component, an interpreter component, and a render component.

16. The device of claim 15, wherein the interpreter component provides an interpreted model object based on data received from the service requestor component, and the renderer component renders a visual representation based on data of the interpreted model object.

17. The device of claim 13, wherein the code is further automatically generated based on receiving a selection of a design element defining an appearance of the widget or based on receiving a selection of a design element for performing a non-service-related function.

18. The device of claim 13, wherein connecting the first output of the first service to the input of the second service comprises sending an object from the first service to the second service in response to occurrence of the event.

* * * * *